United States Patent
Laivins et al.

(10) Patent No.: US 11,420,564 B2
(45) Date of Patent: Aug. 23, 2022

(54) CONFIGURABLE STORAGE SYSTEMS

(71) Applicant: Dragonfly Brands Corporation, Greensboro, NC (US)

(72) Inventors: Glen Laivins, Jamestown, NC (US); Ken Laivins, Jamestown, NC (US); Mario Michael Galasso, Sandy Hook, CT (US)

(*) Notice: Subject to any disclaimer, the term of this patent is extended or adjusted under 35 U.S.C. 154(b) by 0 days.

(21) Appl. No.: 15/734,104

(22) PCT Filed: Feb. 28, 2020

(86) PCT No.: PCT/US2020/020381
§ 371 (c)(1),
(2) Date: Dec. 1, 2020

(87) PCT Pub. No.: WO2020/176854
PCT Pub. Date: Sep. 3, 2020

(65) Prior Publication Data
US 2021/0237653 A1  Aug. 5, 2021

Related U.S. Application Data

(60) Provisional application No. 62/811,663, filed on Feb. 28, 2019.

(51) Int. Cl.
| | |
|---|---|
| *B60R 5/04* | (2006.01) |
| *B60R 7/02* | (2006.01) |
| *B60R 13/01* | (2006.01) |
| *B60R 11/00* | (2006.01) |

(52) U.S. Cl.
CPC ............ *B60R 5/04* (2013.01); *B60R 7/02* (2013.01); *B60R 13/01* (2013.01); *B60R 2011/0036* (2013.01)

(58) Field of Classification Search
CPC .. B60R 5/04; B60R 7/02; B60R 13/01; B60R 2011/0036
USPC ........................................... 296/39.1
See application file for complete search history.

(56) References Cited

U.S. PATENT DOCUMENTS

| | | | |
|---|---|---|---|
| 4,789,574 A | 12/1988 | Selvey | |
| 4,807,760 A * | 2/1989 | Sussman | B65D 25/06 206/581 |
| 4,958,876 A | 9/1990 | Diaco et al. | |
| 5,167,433 A | 12/1992 | Ryan | |
| 5,419,602 A | 5/1995 | VanHoose | |
| 5,806,909 A * | 9/1998 | Wise | B60R 13/01 296/39.1 |
| 6,682,118 B2 * | 1/2004 | Ryan | B60R 11/00 296/37.16 |
| 6,793,110 B2 | 9/2004 | Hamilton | |
| D546,271 S * | 7/2007 | Hanson | D12/426 |
| 2008/0185866 A1 | 8/2008 | Tarrant et al. | |

* cited by examiner

*Primary Examiner* — Peter N Helvey
(74) *Attorney, Agent, or Firm* — Matthew J Patterson

(57) ABSTRACT

Configurable and reconfigurable stowage systems for vehicle storage areas for a vehicles including cars, truck, boats, recreation vehicles, snowmobiles, all-terrain vehicles and the like are disclosed. In some embodiments, vehicle storage areas include saddle bags and trunks of vehicles. In some embodiments the stowage systems include a contourable reconfigurable liner that includes configuration features and partitioning devices.

20 Claims, 13 Drawing Sheets

CONFIGURABLE STORAGE SYSTEMS

CROSS REFERENCE TO RELATED APPLICATIONS

This application claims the benefit of U.S. Provisional Patent Application Ser. No. 62/811,663 filed 28 Feb. 2019 and is a as well as Patent Cooperation Treaty Patent Application Serial No PCT/US2020/020381 filed 28 Feb. 2020. The disclosures of the applications above are incorporated herein by reference in their entirety.

BACKGROUND OF THE INVENTION

Field of the Invention

Embodiments of the present disclosure relate to configurable and reconfigurable stowage systems for vehicle storage areas for a plethora of vehicles including cars, truck, boats, recreation vehicles, snowmobiles, all-terrain vehicles and the like. In some embodiments, vehicle storage areas include spaces created within and integral with the vehicle itself. In some embodiments, vehicle storage areas include saddle bags and trunks of vehicles. In some embodiments the stowage systems include a contourable configurable liner that includes configuration features. In some embodiments the stowage systems include a contourable reconfigurable liner that includes configuration features and partitioning devices. In other embodiments the stowage systems include configuration features that are included in the manufacture of the vehicle storage area and cooperating partitioning devices to configure the storage space.

Description of the Related Art

It is known that many surfaces of vehicles are highly contoured and that accessories are often molded to match the various contours. Prior art molding methods are known to comprise single layer materials and are often complicated and include expensive tooling. Open air wheeled vehicles such as motorcycles, mopeds, or bicycles are often equipped with storage areas such as bags and/or luggage to allow for carrying items safely while being ridden. In other cases, bags and luggage can be added on as accessories for the same purpose. In the case of vehicles such as motorcycles and mopeds, the bags and luggage can be quite large and are often of rigid construction, manufactured from hard materials and can be highly contoured for both aesthetics and to match and package around components of the vehicle such as seats, exhaust pipes and frames. It is known and desirable to safely store items in a saddle bag such as a kickstand puck wherein an exemplary embodiment is disclosed in co-pending U.S. Provisional Patent Application No. 62/800,731, the disclosure of which is incorporated herein in its entirety. Other items can include clothing, tools, liquids, sunglasses, cameras and the like. The large internal volume of such luggage allows stored items to jostle around due to road irregularities and the braking and acceleration forces caused during the act of riding or driving the vehicle. Due to the rigid construction of many of the bags, luggage and storage areas used with such vehicles, and the hard interior surface of many of the bags and luggage as a result of the rigid construction, the resultant jostling can damage and otherwise have deleterious effects on the items being stowed and carried in the bags and luggage. In addition, when the articles move around from the jostling, they do not end up in the same place the user placed them forcing the user to search for the items afterwards due to the act of driving.

For open air vehicles such as motorcycles and mopeds, the storage areas referred to above are typically called saddle bags, trunks and tour packs. Saddle bags are mounted to the rear of the vehicle and are positioned on either side. Trunks are typically mounted over the center of the rear of the vehicle and in the case of two wheel vehicle can be mounted over a rear fender area. In other vehicles such as cars, the storage areas are commonly referred to as trunks and are typically positioned in the rear of the car. With the advent of battery powered electric vehicles the absence of an engine enables a large storage area in the front of some vehicles. Such storage areas are commonly referred to as "frunks" and items stowed in frunks can suffer similar deleterious effects from the movement of the vehicle and the jostling the items encounter as described herein above. Some automobiles having a mid-engine or rear engine configuration also have a frunk positioned in the front end of the vehicle. Other vehicles, such as universal terrain vehicles (commonly referred to as side-by-sides) also have open and unprotected storage areas and stowed items in such vehicles suffer from the same deleterious effects as described herein above as these types of vehicles can travel over rugged and bumpy terrain.

There are several prior art attempts to solve the issue discussed herein above with respect to organization, stowage and protection within vehicle storage areas. One such prior art article is a liner bag system and can be found at www.jpcycles.com/product/505-598/saddlemen-saddlebag-packing-cube-liner-set The liner bag system is comprised of a plurality of small soft sided bags to stow carried items within a saddle bag of a vehicle. One drawback to such an approach is the need to unzip and zip the individual bags for stowing the items to be carried. Additionally, by stacking the smaller bags within the internal volume of the saddle bag, the small bags on top must be removed and placed somewhere outside the saddle bag in order to access and retrieve items stowed in the small bags placed at the bottom of the saddle bag. It is often desired to have quick access to the items stowed in a saddle bag such as the aforementioned kickstand puck, sunglasses or camera.

Another prior art article is a liner bag system and can be found at www.jpcycles.com/product/830-119/drag-specialties-saddlebag-liner-kit. The drawback to this approach is that it may only slightly cushion the interior of the saddle bag and does not address the other deficiencies of prior art saddle bags. In this approach, the piece or pieces to be applied to the bottom of the bag appear to be a type of foam material. The piece or pieces applied to the side of the saddle bag interior walls are rigid pieces, creating the same hard interior surface and large unpartitioned interior volume. A significant drawback to such prior art liner bag systems is, since the material used for the pieces to be adhered to the sides of the saddle bags is thin enough to follow contours, it is parenthetically too thin to provide any true impact resistance. Additionally, some pieces prior art liner bag systems are comprised from a felted material which absorbs moisture, retains and holds dirt and debris, and therefore can develop objectionable odors over time. Since the materials of prior art liner bag systems are somewhat permanently installed, the only way to truly remediate these conditions is to remove the liner bag system completely and replace them with new panels and pieces. Some pieces of prior art liner bag systems are comprised of a plurality of hard plastic and fill recesses of the bottom of the saddle bag. The hard pieces can rattle around and will not provide protection for items stored in the bottom of the saddle bag.

Yet another liner of the prior art can be found at www.jpcycles.com/product/8400086/j-p-cycles-saddlebag-liner. While this type of saddle bag insert creates a convenient way for the stowed items to be removed from the saddle bag and placed into the saddle bag, the same inconvenience of zipper enclosures described above exists with this type of saddle bag insert. Additionally, most of these saddle bag inserts do not have internal partitions, and are not padded, and therefore not preventing the problems of stored item damage or migration to different areas described above with a large unpartitioned internal storage volume and road undulations and driving conditions.

Still other saddle bag storage systems of the prior art are disclosed in U.S. Pat. No. 8,408,437. Although the system disclosed partitions a saddle bag into various compartments using horizontally positioned shelves, it does not further provide for vertical or other partitions and does not have provisions for protecting stowed articles from the hard sides of the saddle bag structure.

What is needed is a system and method to provide, for example, a configurable and reconfigurable stowage system for use in vehicle storage areas.

SUMMARY OF THE INVENTION

Embodiments of the present disclosure include an internal protection and reconfigurable stowage system and method for use in the storage areas of various vehicles. In certain embodiments, items stored in vehicle luggage such as saddle bags and/or a rear trunk are protected from impacts with the otherwise hard interior surface of the saddle bags and/or rear trunk and are limited from moving about and jostling within the large interior volume of the saddle bags and/or rear trunk.

One general aspect includes a configurable stowage system for a vehicle storage space. The configurable stowage system also includes a plurality of configuration features positioned on at least a portion of an inside surface of the vehicle storage space.

Implementations may include one or more of the following features. The configurable stowage system may include at least one partition device adapted to be removably installed in cooperation with at least one of the plurality of configuration features. The configuration features are any of a groove, a kerf cut, a slot or a rib. The at least one partition device is any of a shelf, a partition, an accessory holder or a divider. The configuration features are positioned in the liner assembly and the liner assembly is adapted to be installed within the vehicle storage space. The liner assembly may include at least one conformable panel. The at least one conformable panel may include a conformable impact resistant sheet and an adhesion layer positioned on a side of the conformable impact resistant sheet, where the plurality of configuration features is disposed at least partially within conformable impact resistant sheet, and where the adhesion layer is adapted to affix the at least one conformable panel to the inside surface of the vehicle storage space. The at least one conformable panel may include a liner bucket adapted to conform to the inside surface of the vehicle storage space and where the plurality of configuration features is integral to the liner bucket. The plurality of configuration features is integral to the inside surface of the vehicle storage space. The configurable stowage system may include a liner assembly may include at least one conformable impact resistant panel, an adhesion layer positioned on a side of the at least one conformable impact resistant panel, and the plurality of configuration features may include a plurality of kerf cuts disposed at least partially through the at least one conformable impact resistant panel. The inside surface of the vehicle storage space includes a contoured surface and where the plurality of kerf cuts enables the at least one conformable impact resistant panel to closely match the contoured surface. The adhesion layer is adapted to affix the at least one conformable impact resistant panel to the inside surface of the vehicle storage space.

One general aspect includes a method for configuring a storage space of a vehicle. The method also includes positioning a plurality of configuration features on at least a portion of an inside surface of the storage space.

Implementations may include one or more of the following features. The method may include removably installing at least one partition device into at least one of the plurality of configuration features. The plurality of configuration features is any of a groove, a kerf cut, a slot or a rib. The at least one partition device is any of a shelf, a partition, an accessory holder or a divider. The plurality of configuration features is positioned in a liner assembly. The liner assembly may include at least one conformable panel. The at least one conformable panel may include a conformable impact resistant sheet, the method may include disposing the plurality of configuration features at least partially within conformable impact resistant sheet and affixing an adhesion layer to the at least one conformable panel and to an inside surface of the storage space. The at least one conformable panel may include a liner bucket adapted to conform to the inside surface of the storage space and where the plurality of configuration features is integral to the liner bucket. The method may include providing a liner assembly may include at least one conformable impact resistant panel, applying an adhesion layer on a side of the at least one conformable impact resistant panel, and forming the plurality of configuration features by disposing a plurality of kerf cuts at least partially through the at least one conformable impact resistant panel. The inside surface of the storage space includes a contoured surface, the method may include applying the at least one conformable impact resistant panel with the contoured surface using the plurality of kerf cuts. The method may include affixing the adhesion layer to the inside surface of the storage space. The plurality of configuration features is integral to the inside surface of the storage space.

One general aspect includes a method of retrofitting a storage space of a vehicle. The method of retrofitting also includes providing a storage space of a vehicle having an interior space and an interior surface; and positioning a plurality of configuration features on at least a portion of the inside surface of the storage space.

Implementations may include one or more of the following features. The method may include removably installing at least one partition device into at least one of the plurality of configuration features. The plurality of configuration features is any of a groove, a kerf cut, a slot or a rib. The at least one partition device is any of a shelf, a partition, an accessory holder or a divider. The plurality of configuration features is positioned in a liner assembly. The liner assembly may include at least one conformable impact resistant panel. The method may include disposing the plurality of configuration features at least partially within the at least one conformable impact resistant panel, and affixing an adhesion layer to the at least one conformable impact resistant panel and to an inside surface of the storage space. The at least one conformable impact resistant panel may include a liner bucket adapted to conform to the inside surface of the storage space and where the plurality of configuration features is integral to the liner bucket. The method may include providing a liner assembly may include at least one conformable impact resistant panel, applying an adhesion layer on a side of the at least one conformable impact resistant panel, and forming the plurality of configuration features by disposing a plurality of kerf cuts at least partially through the at least one conformable impact resistant panel. The inside surface of the storage space includes a contoured surface, the method may include applying the at least one conformable impact resistant panel with the contoured surface using the plurality of kerf cuts. The method may include affixing the adhesion layer to the at least one conformable impact resistant panel and to the inside surface of the storage space.

BRIEF DESCRIPTION OF THE DRAWINGS

So that the manner in which the above-recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following detailed description of the embodiments, reference is made to the accompanying drawings, which form a part hereof, and within which are shown by way of illustration specific embodiments by which the examples described herein may be practiced. It is to be understood that other embodiments may be utilized and structural changes may be made without departing from the scope of the disclosure.

Figure 1:
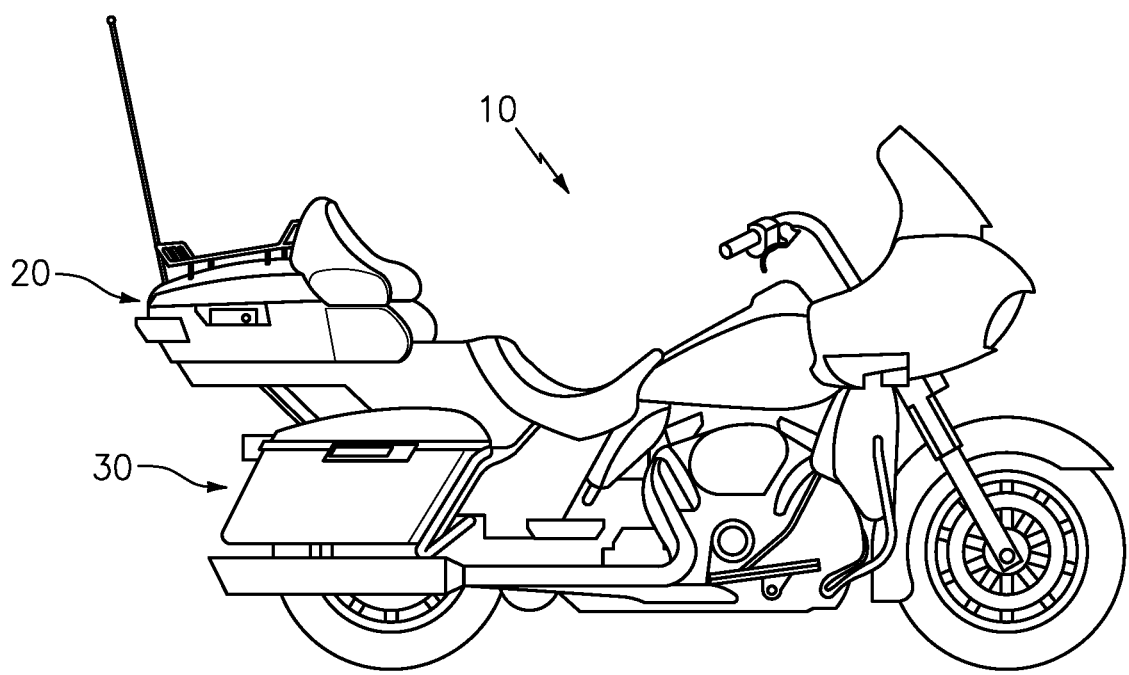
FIG. 1 is a side view of a vehicle with detachable saddle bags and trunk of the prior art.
Figure 2:
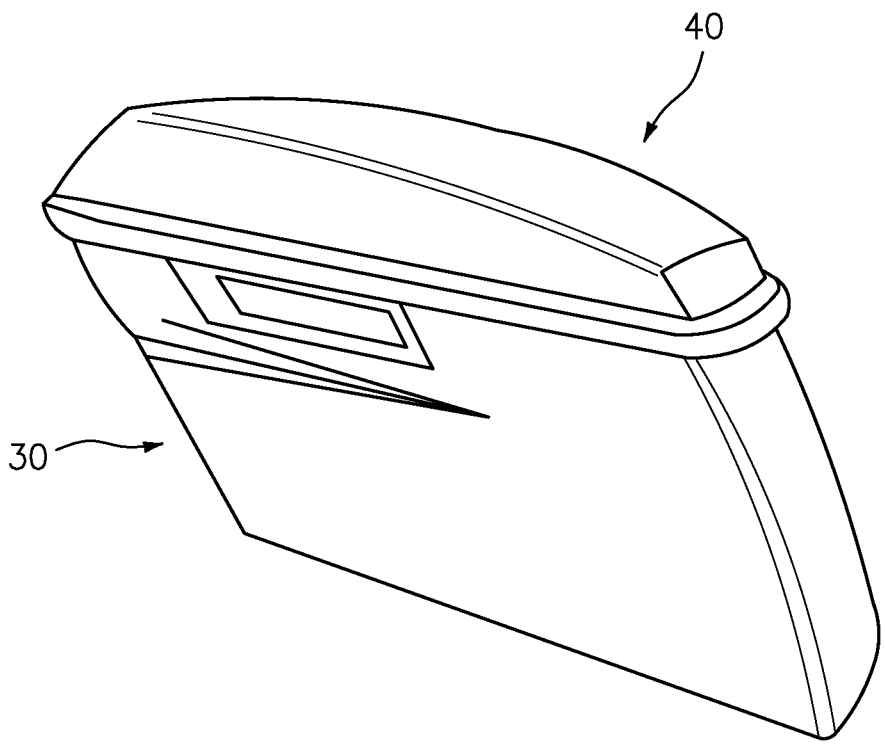
FIG. 2 is a perspective view of a saddle bag with a reconfigurable compartment system and liner in accordance with certain embodiments of the present disclosure.

Referring now to FIG. 1, there is shown an open-air vehicle in the form of motorcycle 10 with trunk 20 and saddle bag 30 assembled to it. It should be appreciated by those skilled in the art that motorcycle 10 can be fit with a second saddle bag 30 on the opposite side of the rear wheel of the motorcycle. The exterior of saddle bag 30 is best shown with reference to FIG. 2 wherein the saddle bag also includes a hinged cover 40. The interior volume 31 of saddle bag 30 is best shown with reference to FIG. 3.

Embodiments of the present disclosure include vehicle storage areas having configuration features and partitioning devices to permit configurable, and reconfigurable, interior layouts. Such embodiments include configuration features such as slots, tabs and the like and partitioning devices such as shelves, dividers and partitions that cooperate therewith. Some embodiments of the present disclosure further include materials and methods to provide for foam, or other impact resistant material, sheeting materials configurable to be highly contourable. Such materials include rubbers, closed cell foam, polyethylene foam, EVA foam and the like. An impact resistant sheet can comprise a single layer of impact resistant materials, a plurality of layers of the same type of impact resistant material having different structural properties, and a plurality of layers selected from a combination of different materials. The layers of impact resistant material can be different colors to produce various effects upon machining as will be described in more detail herein after. The impact resistant sheet can be configured to have varying flexibility so as to be highly contourable by providing features in the impact resistant sheet such as kerf cuts and darts and layering techniques which is also disclosed in more detail herein after.

So that the nature of the discoveries of the present disclosure can be appreciated, a class of embodiments will be described herein after. Such disclosure is not meant to limit the scope of this disclosure which shall only be limited by the claims set forth herein after.

Some embodiments of the present disclosure relate to detachable luggage for "open air" type vehicles, including trikes, quads, motorcycles, mopeds and bicycles. This embodiment relates to luggage, such as saddle bags and rear trunks, for such vehicles. Some embodiments are particularly directed towards protective liners and partitioning and accessory systems for the inside of saddle bags and rear trunk compartments wherein, for purposes of this disclosure, such embodiments of these stowage systems can be referred to as liner assemblies. The liner assemblies protect items being carried in the saddle bags and/or rear trunk compartments by contour matching and padding the interior walls of the storage areas and providing configurable, and reconfigurable, partitions and accessories so items being transported are properly supported during riding and more easily accessible when being unloaded. The reconfigurable stowage system of the present disclosure addresses the aforementioned potential hazards and inconveniences stowed items can be subjected to when carried in vehicle storage areas without impact resistant padding to protect, or partitioning to secure, such items during normal operating conditions provided in the prior art.

Embodiments of the present disclosure of the reconfigurable stowage system can be made up of multiple impact resistant panels and multiple configurable partitions. In some embodiments the impact resistant panels are configured to be adhesively fixed to the interior walls of a vehicle's storage area. Additionally, the impact resistant panels can be manufactured with strategically located configuration features, such as grooves, on the interior facing surfaces of the panels. The aforementioned partitioning devices, which can be comprised of a rigid material such as plastic, are designed to fit within and be secured by the configuration features manufactured into the impact resistant panels. The combination of the impact resistant panels, the manufactured configuration features, and the partitioning devices create a configurable and reconfigurable stowage system allowing a user to configure the vehicle storage area in a manner to confidently stow gear and accessories in a padded, protected and partitioned interior volume. Such configuration can be performed quickly and without the use of tools.

In an example embodiment of a reconfigurable stowage system, at least some of the impact resistant panels include a layer of adhesive. The layer of adhesive can comprise a dual sided paper backed pressure sensitive adhesive wherein the paper backing is maintained until installation as will be described herein below. The impact resistant panels can have multiple layers of various materials co-laminated together to result in one unitary sheet. One of the layers can be an impact resistant material of a first color. The second of layer can be an impact resistant material of a second color and a third layer can comprise the afore described dual sided adhesive layer. One side of the adhesive layer is utilized to laminate this layer to the exposed surface of the second layer. The removable paper backing material is provided to cover the adhesive on a second side of the adhesive layer. When the co-laminated impact resistant panel is ready to be installed into a storage container or luggage, the removable backing is removed, exposing adhesive, with said adhesive then utilized to affix the impact resistant panel to its predetermined location on an inside surface of the vehicle storage area, i.e. a saddle bag and/or rear trunk.

Due to the irregularity of the internal shapes and contoured surfaces of vehicle storage areas, the previously described impact resistant panels can be provided with features that increase the conformability of the impact resistant panels. For instance, in order to conform to a contour of fairly constant radius, the impact resistant panel can include kerf cuts perpendicular to, and at least partially through the first layer. The impact resistant panel can then be kerf bent to contour match the curve. Kerf bending is implemented in a variety of ways, but in short, it's a way of strategically removing material to allow for flexibility while maintaining a continuous surface. As will be described in more detail herein after, the reconfigurable stowage system of the present disclosure can be comprised of any number of pieces, or a single piece, to facilitate ease of installation and utility.

As discussed herein above, configuration features in the form of grooves are provided in at least two layers of the impact resistant panels or at least a portion of a vehicle storage volume. The grooves can have a predetermined depth to cooperate with the corresponding partition devices. In embodiments where a multi-layer impact resistant panel is used, where such predetermined depth protrudes through the first layer, and wherein the first layer is a different color than the second layer this effect can allow a user to efficiently locate the grooves as well as providing an aesthetically pleasing effect by exposing the underlying color of the second layer. When installed, the assembly of an impact resistant panel will line some, all or substantially all of the interior surfaces of the vehicle storage volume, providing impact resistance and energy absorption for the stowed items.

Additionally, partitioning devices, such as shelves, partitions and dividers, can be comprised of any suitable rigid material such as rubber, EVA foam, plastic, and the like and are included as part of the configurable stowage system of the present disclosure. The partitioning devices are selected from a thickness such that they firmly removably engage within the grooves formed in the impact resistant panel described above. The dimensions of the partitioning devices are selected to fit within the configuration features and slide or snap into and out of place. The combination of the configuration features and the installed partitioning devices create smaller user configured volumes within the overall internal volume of the vehicle storage volumes. These smaller, user configured volumes reduce the amount of movement and jostling stowed items experience due to riding operating conditions and road irregularities, further reducing the potential for damage. It should be appreciated by those skilled in the art that a plurality of configurations can be created from the combination of configuration features and partitioning devices. This combination can create shelving, with storage within, below and on top of the shelving. This combination can also create discrete compartments, with said compartments designed to stow specific things such as cameras, computers, shoes, kickstand pucks, phones, tools, vehicle covers, etc.

Figure 4:
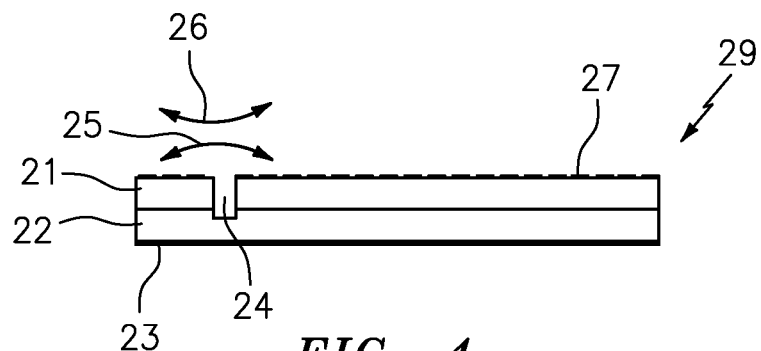
FIG. 4 is a side view of a conformable impact resistant laminate in accordance with certain embodiments of the present disclosure.

An embodiment of conformable impact resistant sheet 29 is shown in FIG. 4 wherein the conformable impact resistant sheet is comprised of an impact resistant layer 21, a second impact resistant layer 22 and an adhesion layer 23. As disclosed herein above, first impact resistant layer 21 and second impact resistant layer 22 can comprise any suitable type impact resistant material and the layers may be of different colors or shades of color such as the first layer having a dark color and the second layer having a lighter color by contrast or the other way around. In addition, the first impact resistant layer 21 and second impact resistant layer 22 can be bonded together by any known and suitable method to provide a substantially unitary composite sheet including bonding, gluing, friction bonding, etc. Also, as described herein above, first impact resistant layer 21 and second impact resistant layer 22 can comprise impact resistant materials of different mechanical properties depending on the application. For instance, the first impact resistant layer can be drapeable. In other embodiments, first impact resistant layer 21 may be comprised of a denser, and therefore stiffer, impact resistant material than that of second impact resistant layer 22. In such a configuration kerf cut 24 will have a substantial effect on the bending stiffness of conformable impact resistant sheet 29 in the direction of arrows 25, 26. Adhesion layer 23 can comprise a double sided paper backed pressure sensitive adhesive applied to the backside of second impact resistant layer 22 (away from the bond with first layer 21). It is also within the scope of the present disclosure that adhesion layer 23 can comprise other types of adhesive and glue and methods can be applied to the backside of second impact resistant layer 22. For example, the reconfigurable stowage system, described herein below, can be semi permanently attached to the saddle bag 30 with hook-and-loop fastener strips (not shown). The hook-and-loop fastener strips provide enough fixing strength such that the liner system will remain attached to the saddle bag as long as is desired by the user, but can be removed if desired without damage to the vehicle storage volume, i.e. saddle bag or liner, by using known methods. In certain embodiments of the present disclosure conformable impact resistant sheet 29 can include a textured surface by including raised features 27 on a top side of first impact resistant layer 21. One embodiment of the present disclosure utilizes multiple layers of impact resistant materials laminated together by adhesive means. The first impact resistant layer 21 of the lamination can be the primary aesthetic surface and color, and is the primary surface providing impact resistance for the stowed items within the saddle bag 30. As discussed, each layer of impact resistant materials in the lamination can be a different color, such that when the top layer(s) is(are) machined through, the color of the next layer in the lamination is revealed. This is referred to herein as contrast cutting of a multi-layer laminate. Conformable impact resistant sheets 29 can also stamped, or molded, or water jet cut to comprise reconfigurable stowage system 60 (FIG. 5) and the variously described partitioning devices.

Figure 3:
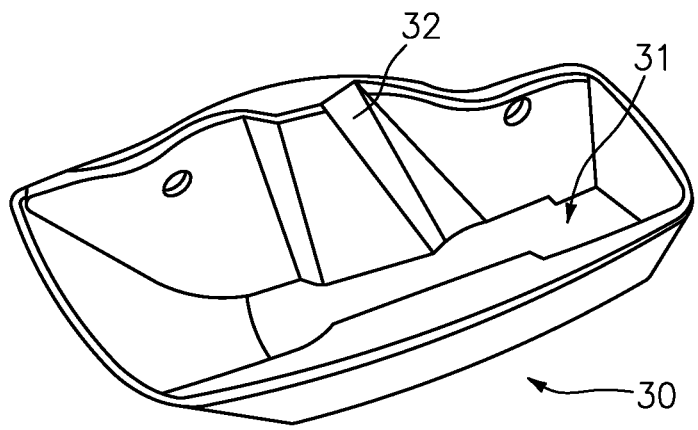
FIG. 3 is a perspective view of the interior of a saddle bag of the prior art.
Figure 5:
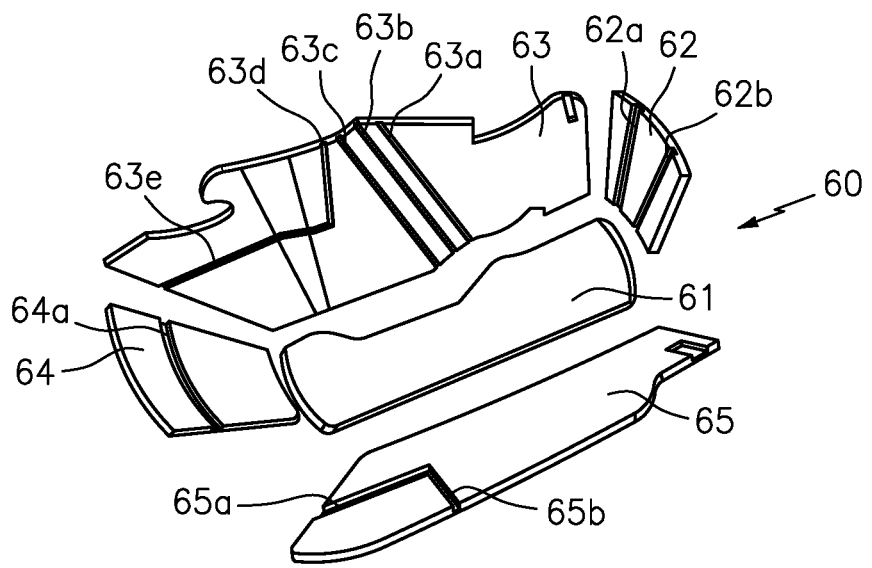
FIG. 5 is an exploded perspective view of a liner system in accordance with certain embodiments of the present disclosure.

Now referring to FIG. 5, there is shown a liner assembly of a reconfigurable stowage system 60 configured for positioning within interior volume 31 of saddle bag 30 (FIG. 3) and includes conformable impact resistant panels comprised of bottom panel 61 (which can comprise a plurality of pieces), rear panel 62, inside panel 63, front panel 64 and outside panel 65. All or some of bottom panel 61, rear panel 62, inside panel 63, front panel 64 and outside panel 65 can be comprised of conformable sheet panel 29 or variations thereof as described herein above. Configuration features in the form of kerf cuts 63a, 63b, 63c are positioned in inside layer 21 of inside panel 63 to allow the inside panel to conform to the contoured surface 32 portion of the inside surface of saddle bag 30 (FIG. 3). Also shown in FIG. 5 are configuration features in the form of partition grooves 63d, 63e in inside panel 63; partition groove 64a positioned in rear panel 64; partition grooves 65a, 65b positioned in outside panel 65 and partition grooves 62a, 62b positioned in rear panel 62 the function of which will be described in more detail herein after. One such embodiment can be found at the following link https://hardstreet.com/saddlebag-shelf-feature-page.

Figure 6:
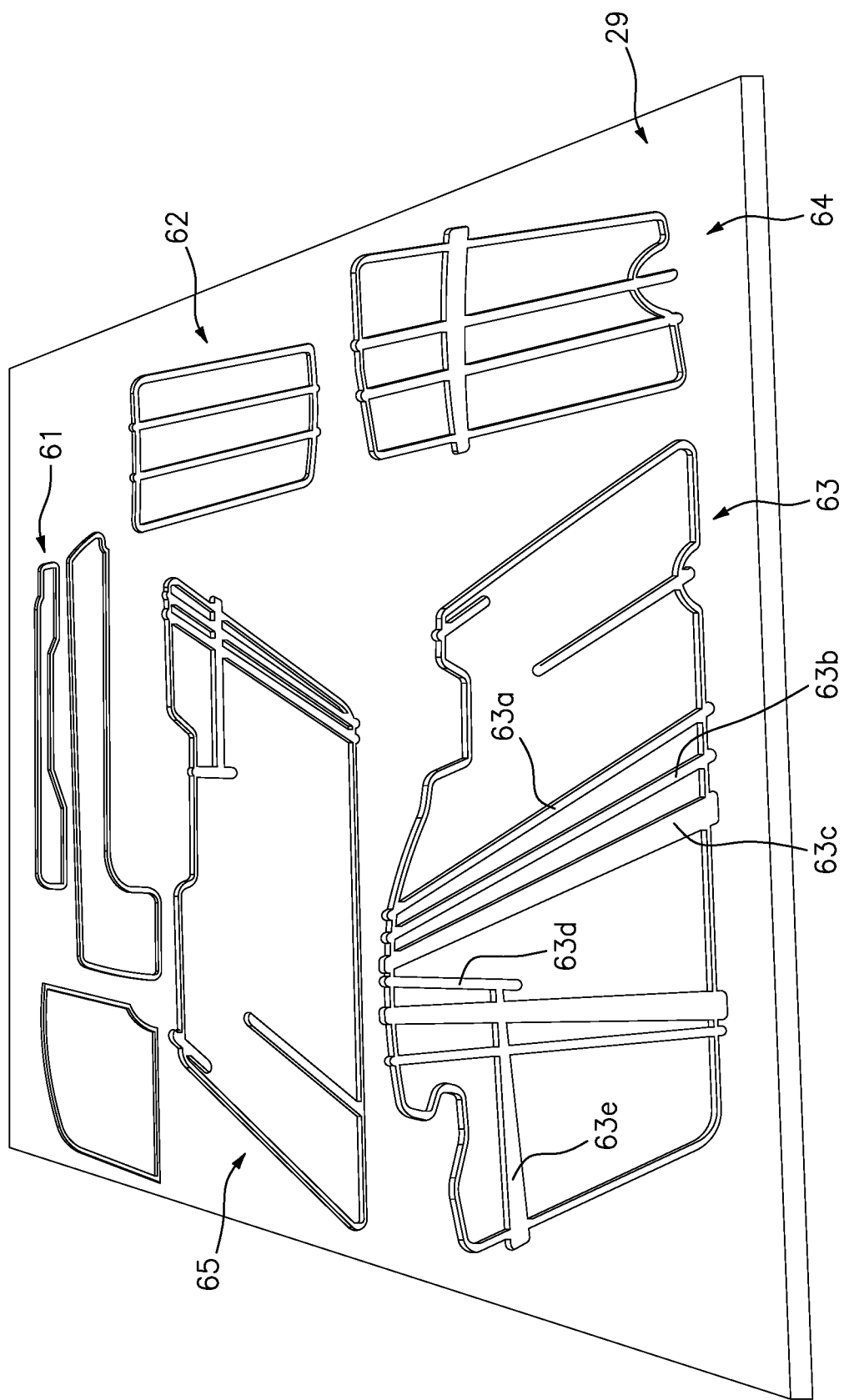
FIG. 6 is a perspective view of a contourable composite impact resistant sheet and a liner system in accordance with certain embodiments of the present disclosure.

Referring now to FIG. 6 there is shown reconfigurable stowage system 60 of FIG. 5 in a stage of manufacture from contourable composite impact resistant laminate sheet 29. In operation, composite impact resistant laminate sheet 29 is releasably attached to bed of a computer numerical control (CNC) machine. The CNC machine can be any known type of CNC machine that includes at least a two-dimensional gantry and a cutting head with a suitable cutter installed therein. The CNC machine is controlled using a computer file containing the data necessary to make the various cuts to manufacture reconfigurable stowage system 60 as will be described in more detail herein after. The perimeters of the conformable panels including bottom panels 61a, 61b, rear panel 62, inside panel 63, front panel 64 and outside panel 65 are outline cut at least partially through first impact resistant layer 21 and can be partially cut into second impact resistant layer 22 (FIG. 4). Other configuration features can be machined into composite impact resistant laminate sheet 29 such as kerf cuts 63a, 63b, 63c and configuration features in the form of partition grooves 63d, 63e in inside panel 63. The perimeters of bottom panels 61b, rear panel 62, inside panel 63, front panel 64 and outside panel 65 are finish cut and the panels are removed. Shelves and other partitioning devices can similarly be fabricated using such techniques disclosed.

Figure 7:
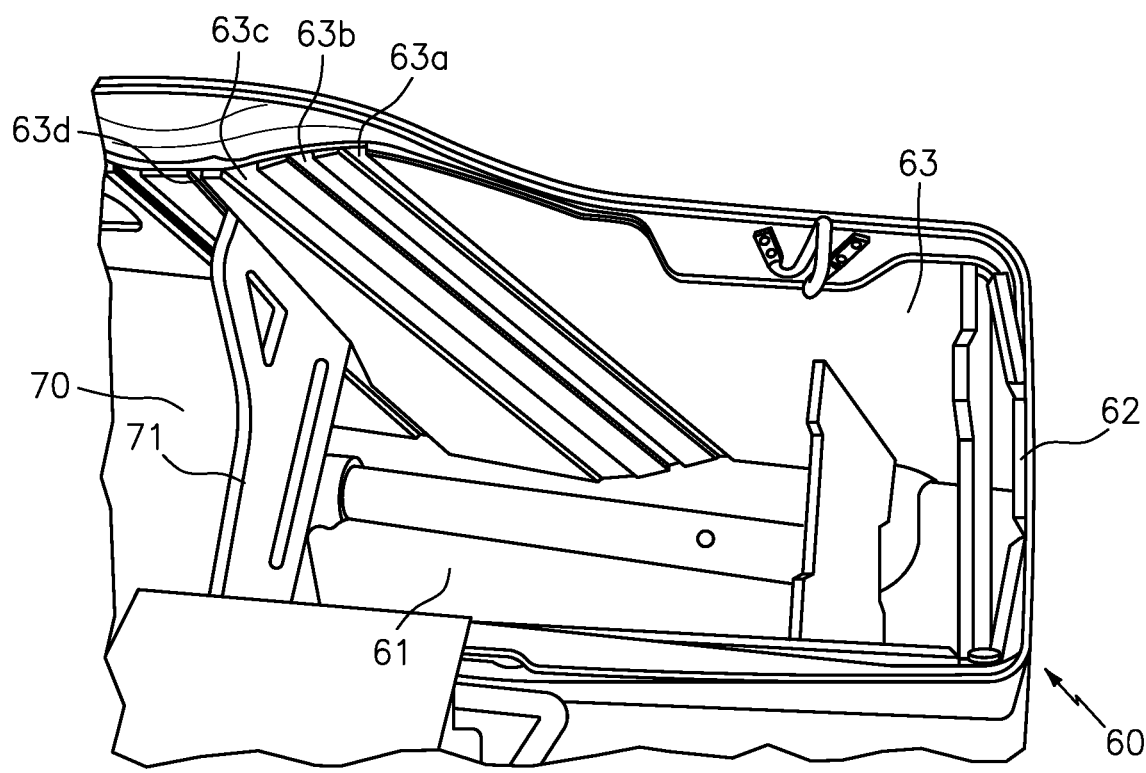
FIG. 7 is a perspective view of a liner system in accordance with certain embodiments of the present disclosure.
Figure 8:
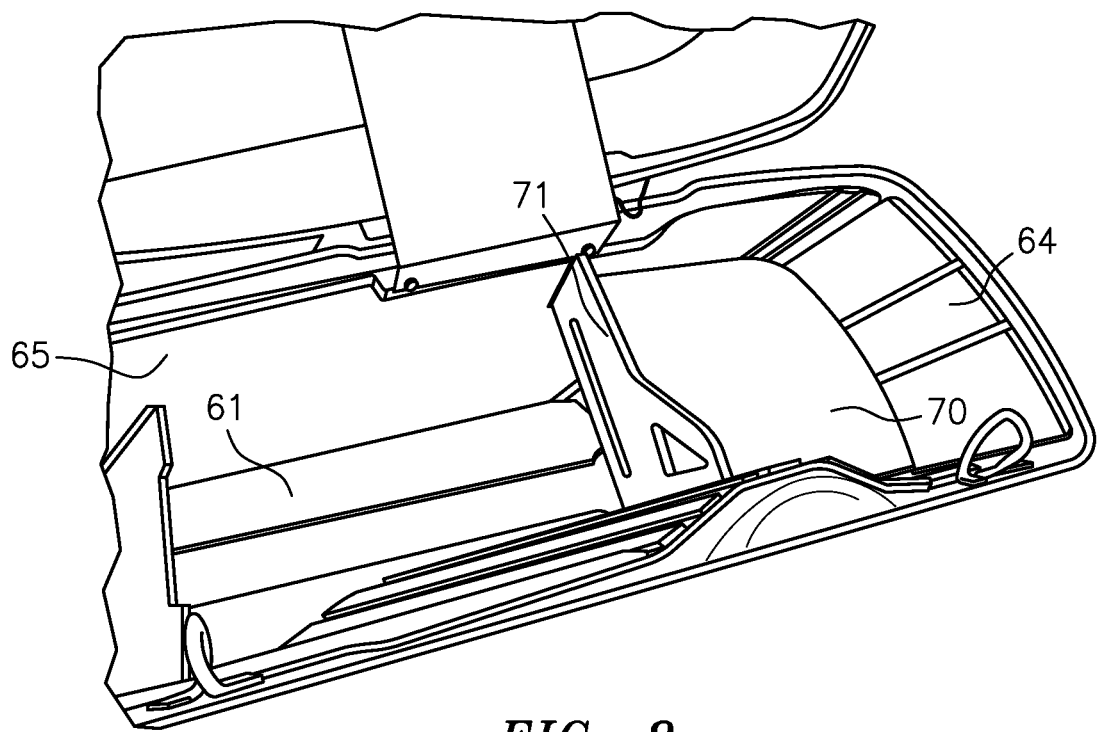
FIG. 8 is a perspective view of a liner system in accordance with certain embodiments of the present disclosure.

Referring to FIGS. 7 and 8, there is shown reconfigurable stowage system 60 positioned with the interior of a vehicle storage volume, specifically saddle bag 30. In its assembled condition reconfigurable stowage system 60 includes inside panel 63 positioned in the inside of saddlebag 30 with kerf cuts 63a-63c positioned over the highly contoured surface of the shock tower relief and vertical partition 71 is removably installed in cooperation with partition groove 63d and horizontal shelf 70 is removably installed in cooperation with partition groove 63e (FIG. 5). It should be appreciated by those skilled in the art that the configuration features of kerf cuts 63a-63c enable the stowage system to include a fewer number of panels that might otherwise be possible. Also shown is rear panel 62 positioned against the rear wall and front panel 64 positioned against the front wall of the interior volume of saddlebag 30. In addition, outside panel 65 is shown positioned against the outside wall of the interior volume of saddlebag 30. It should be noted that vertical partition 71 provides, together with inside panel 63, front panel 64 and outside panel 65, an enclosed area about horizontal shelf 70 such that articles placed thereon have a limited space within which to move. In some embodiments, a smaller version of reconfigurable stowage system 60 is provided for the from portion of saddle bag 30 comprised of a portion of inside panel 63 and a portion of outside panel 65 together with front panel 64 and grooves 63*e*, 64*a* and 65*a* (FIG. 5) and horizontal shelf 70 and vertical partition 71. In the embodiment shown in FIGS. 7 and 8, reconfigurable stowage system 60 is installed within the vehicle storage volume by first cleaning the inside surface of saddlebag 30 with a suitable solvent or cleaner. Then, with clean ungloved hands, a user peels the paper backing off of adhesive layer 23 (FIG. 4) for panel 63 and, using the shock tower relief and the top edge of saddlebag 30 as guides, the user applies the adhesive layer against the inside surface of the saddle bag by "walking" the panel along the inside surface of the saddle applying pressure along the way. The user installs rear panel 62 front panel 64 and outside panel using similar techniques. Bottom panel 61, shown as a single piece, includes an adhesive layer, and in this embodiment the bottom panel is adhered to the inside surface of the bottom of saddlebag 30. In some embodiments, bottom 61 can include standoffs (not shown) to elevate the panel above the bottom of saddlebag 30 creating a storage space therebetween or the inside and outside panels can horizontal configuration features that accept a horizontal false floor (not shown). Horizontal shelf 70 is installed into the configuration features by inserting an edge of the shelf into groove 63*e* (FIG. 5) and then pushing it downward into groove 65 a in outside panel 65. Once horizontal shelf 70 is in place, vertical partition 71 is installed by a user into the configuration features by first by inserting an edge of the vertical partition into groove 63*d* and the snapping the opposite edge into groove 65*b* in outside panel 65. With vertical partition 71 biased within grooves 63*d* and 65*b* horizontal shelf 70 is held in place and a storage space is defined by the interior of saddlebag 30, the horizontal shelf and the vertical partition. In some configurations vertical partition 71 includes a slot that cooperates with a tab positioned on horizontal shelf 70 and when installed, the tab and slot are engaged, giving further vertical support to the horizontal shelf (not shown).

Figure 9:
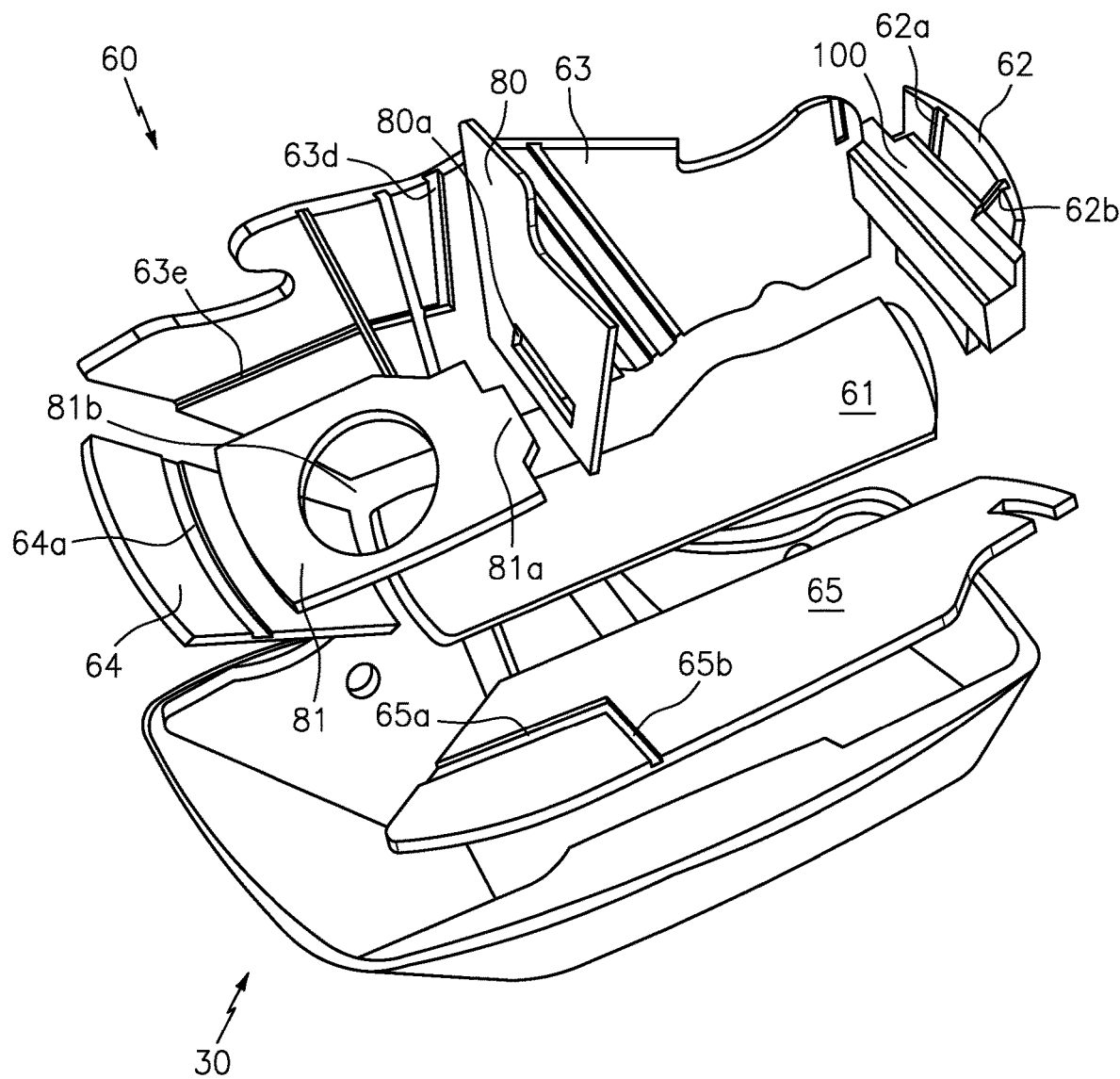
FIG. 9 is a perspective view of a saddle bag with a reconfigurable compartment system and liner in accordance with certain embodiments of the present disclosure.

Now referring to FIG. 9 there is shown reconfigurable stowage system 60 positioned above interior volume 31 of saddle bag 30 prior to installation. In this particular embodiment, vertical partition 80 includes slot 80*a* and can be removably engaged within configuration features, partition groove 63*d* and partition groove 65*b* in outside panel 65 and partition groove 63*d* in inside panel 63. Also disclosed in this particular embodiment is shown an accessory holder such as horizontal partition 81 which includes mounting tab 81*a* and cup holder support hole 81*b*. Horizontal partition 81 comprises a cup holder and is installed within liner system 61 by positioning mounting tab 81*a* within slot 80*a* and engaging the horizontal partition within mounting groove 63*e* in inside panel 63, mounting groove 64*a* in front panel 64. and mounting groove 65*a* in outside panel 65. It should be appreciated that with vertical portion 80 and horizontal partition 81 removably installed within reconfigurable stowage system 60 articles within interior volume 31 of saddle bag 30 are secured and protected. Although on one embodiment is described, a plurality of embodiments having various partitioning devices and configuration features is within the scope of the present disclosure. Also shown in this particular embodiment is light 100 having tabs (not shown) engaged within mounting grooves 62*a*, 62*b* in rear panel 62. Light 100 can comprise any known light source and can be battery powered.

As described herein above, reconfigurable stowage system 60 can be manufactured from any structurally appropriate material providing energy absorption/impact resistance such as foam, rubber, or closed cell gel. The present embodiment can utilize laminated impact resistant sheets 29 and computer numerical control machining to produce the final impact resistant panels disclosed herein above.

Partitioning devices, such as vertical portion 80 and horizontal partition 81, can be manufactured from any structurally appropriate material providing enough rigidity to properly create the configurable volumes within saddle bags 30 and/or rear trunk 20. The present embodiment can use ABS plastic sheets computer numerical control machined, stamped, injection molded, etc., to create the final shapes required to integrate with the various partition grooves of reconfigurable stowage system 60.

Figure 10:
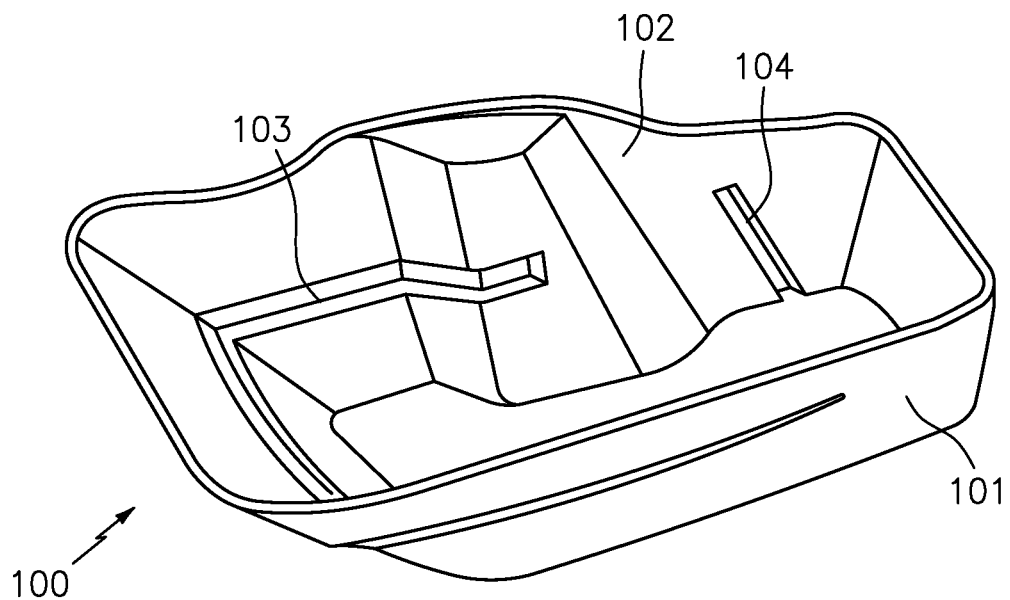
FIG. 10 is a perspective view of a configurable saddlebag liner tub in accordance with certain embodiments of the present disclosure.
Figure 11:
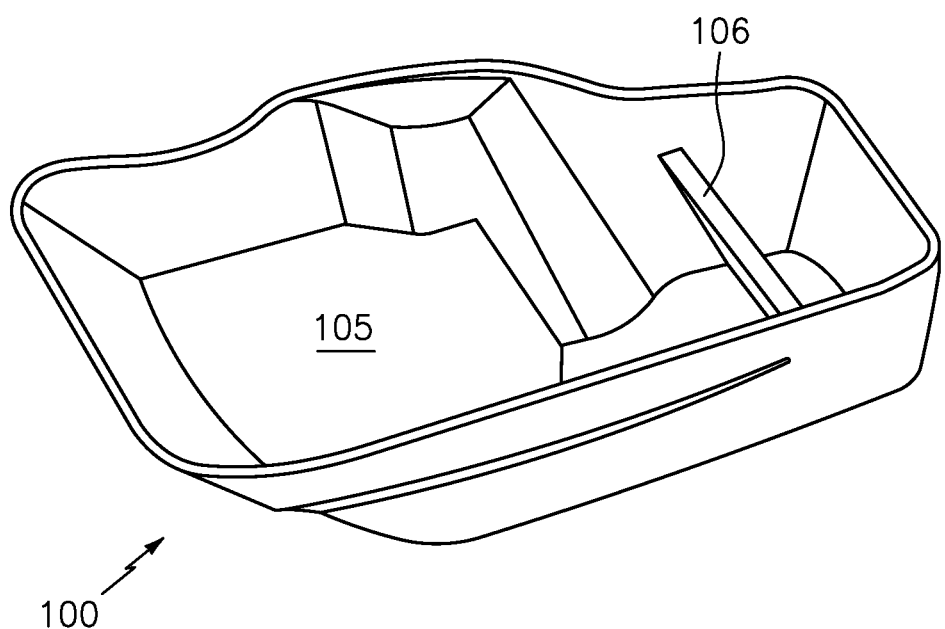
FIG. 11 is a perspective view of the configurable saddlebag liner tub of FIG. 10 in accordance with certain embodiments of the present disclosure.

Referring now to FIG. 10, there is shown a reconfigurable stowage system of the present disclosure, merely by way of example and in no way limiting the disclosure hereof, featuring a liner bucket 100 having an outside portion 101 and an inside portion 102. In this particular embodiment, liner bucket 100 is comprised of a single piece and can be formed using any known technique such as blow molding, compression forming, injection molding and the like. Further, liner bucket 100 can be comprised from various materials such as rubber, foam, synthetic felt and the like or a composite thereof. In addition, liner bucket 100 can be comprised of a composite of multiple materials and can include a non-skid surface on at least a portion of inside portion 102. In this particular embodiment, outside portion 101 is formed to match the shape and contours of interior volume 31 of saddlebag 30 (FIG. 3). Liner bucket 100 includes configuration features on inside portion 102 for configuring the reconfigurable stowage system such as horizontal groove 103 and vertical groove 104. Horizontal groove 103 and vertical groove 104, and other configuration features on inside portion 102 (not shown), can be formed by any known method, including machining, but can advantageously be integrally formed during the manufacturing process of the single piece liner bucket 100. With reference to FIG. 11, reconfigurable stowage system 100 can be configured to include shelf 105 removably positioned within horizontal groove 103 and vertical partition 106 removably positioned within vertical groove 104. As described herein before, shelf 105 and vertical partition 106 can be comprised of any suitable material and can be used separately or in combination and in combination with other shelves and partitioning devices. In operation, a user inserts shelf 105 inside of liner bucket 100 from the top and urges an edge of the shelf into groove 103 in the inside surface 102 near shock tower relief 107 and then while pushing down on the shelf snaps the shelf into horizontal groove 103 opposite the shock tower relief until the shelf is fully positioned within the horizontal groove. In some embodiments where liner bucket 100 is comprised of a compliant material, shelf 105 can be sized slightly larger than the opening created by horizontal groove 103 producing a snug fit between the liner tub and the shelf. Similarly, a user inserts vertical partition 106 inside of liner bucket 100 by inserting an edge of the partition into vertical groove 104 and then urges the opposite edge into a configuration feature matching the vertical groove on the opposite side of the liner bucket until the partition is fully positioned within the vertical groove. Also, in some embodiments where liner bucket 100 is comprised of a compliant material, vertical partition 106 can be sized slightly larger than the opening created by vertical groove 104 producing a snug fit between the liner tub and the vertical partition. Once assembly as described, liner bucket 100 along with shelf 105 and vertical partition 106 can be fitted, or "dropped", into interior volume 31 of saddlebag 30. In addition, the fitting of shelf 105 and vertical partition 106 can be removed and refitted with liner bucket 100 positioned within interior volume 31 of saddlebag 30. It should be appreciated that the various configuration features and partition devices can be used in various combinations and permutations without departing from the scope of the present disclosure.

Figure 12:
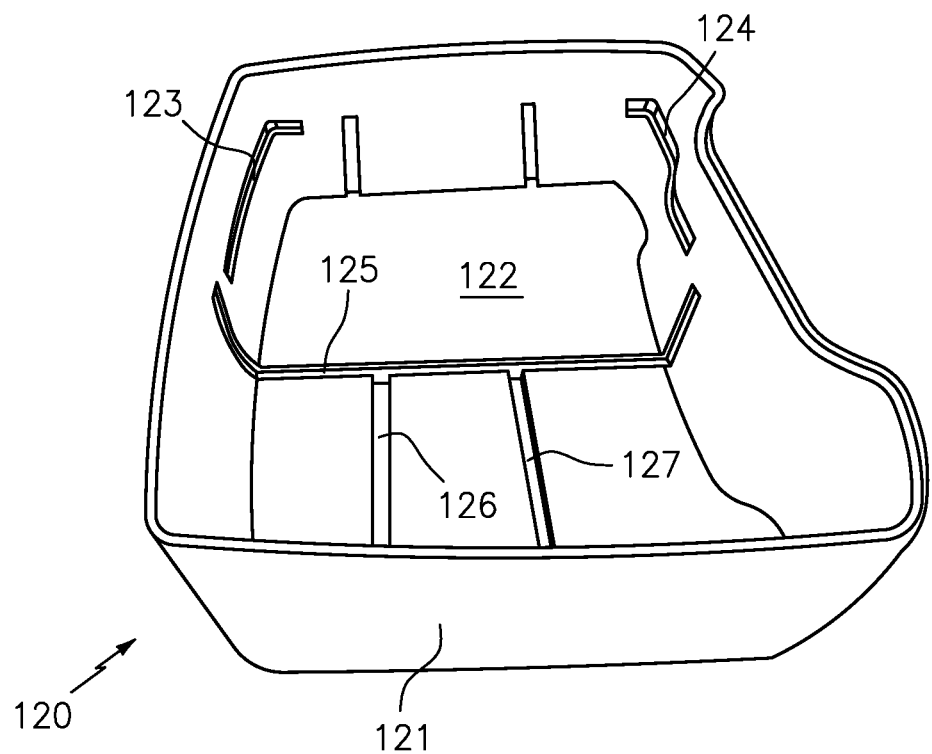
FIG. 12 is a perspective view of a configurable trunk liner tub in accordance with certain embodiments of the present disclosure.
Figure 13:
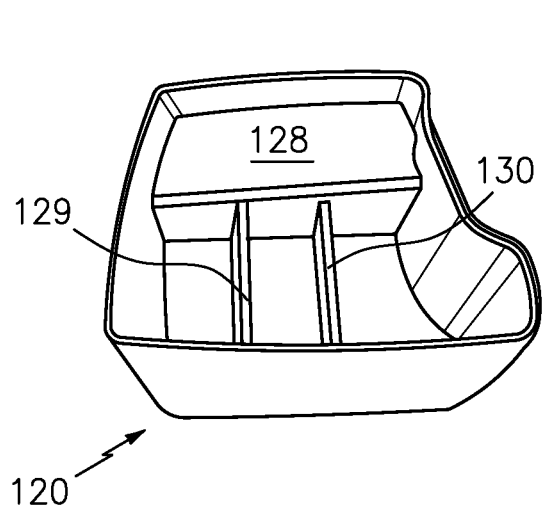
FIG. 13 is a perspective view of the configurable trunk liner tub of FIG. 12 in accordance with certain embodiments of the present disclosure.
Figure 14:
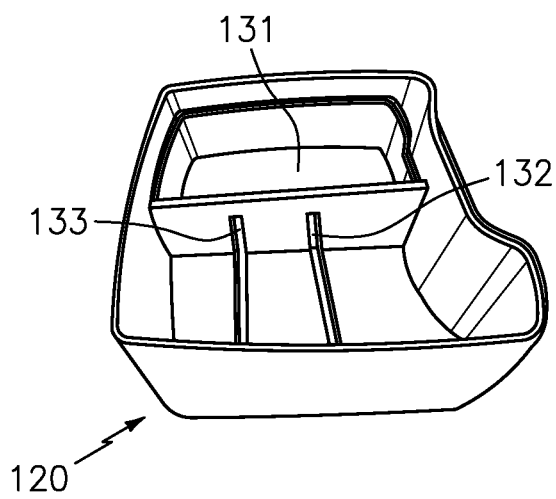
FIG. 14 is a perspective view of the configurable trunk liner tub of FIG. 12 in accordance with certain embodiments of the present disclosure.

Referring now to FIG. 12, there is shown a reconfigurable stowage system featuring a trunk liner bucket 120 having an outside portion 121 and an inside portion 122. In this particular embodiment, trunk liner bucket 120 is comprised of single piece and can be formed using any known technique such as blow molding, compression forming, injection molding and the like. Further, trunk liner bucket 120 can be comprised from various materials such as rubber, foam, synthetic felt and the like. In addition, trunk liner bucket 120 can be comprised of a composite of multiple materials and can include a non-skid surface on at least a portion of inside portion 122. In this particular embodiment, outside portion 121 is formed to match the shape and contours of interior volume of trunk 20 (FIG. 1). Trunk liner bucket 120 includes configuration features on inside portion 122 for configuring the reconfigurable stowage system such as horizontal grooves 123, 124, transverse groove 125 and longitudinal grooves 126, 127. Horizontal grooves 123, 124, transverse groove 125 and longitudinal grooves 126, 127, and other configuration features on inside portion 122 (not shown), can be formed by any known method, including machining, but can advantageously be formed during the manufacturing process of the single piece trunk liner bucket 120. With reference to FIG. 13, the reconfigurable stowage system can be configured to include shelf 128 removably positioned within horizontal grooves 123, 124 and vertical partitions 129, 130 removably positioned within longitudinal grooves 126, 127 respectively. As described herein before, shelf 128 and vertical partitions 129, 130 can be comprised of any suitable material and can be used separately or in combination and further in combination with other shelves and partitioning devices. In operation, a user inserts shelf 128 inside of trunk liner bucket 120 from the top and inserts an edge of the shelf into horizontal groove 124, and then urges the shelf downwardly into horizontal groove 123 until the shelf is fully positioned within the horizontal grooves. In some embodiments where trunk liner bucket 120 is comprised of a compliant material, shelf 128 can be sized slightly larger than the opening created by horizontal grooves 123, 124 producing a snug fit between the liner bucket and the shelf. Similarly, a user inserts vertical partitions 129, 130 inside of trunk liner bucket 120 from the top and slides them into longitudinal grooves 126, 127 respectively until the partitions are engaged within the vertical grooves. Now with reference to FIG. 14, the reconfigurable stowage system can be configured to include transverse partition 131 removably positioned within transverse groove 125. It should be noted that transverse partition 131 includes slots 132, 133 and, when used with vertical partitions 129, 130, the slots cooperate with the vertical partitions to further position and stabilize the transverse partition and the vertical partitions. Once assembly as described, trunk liner bucket 120 along with shelf 128, vertical partitions 129, 130 and transverse partition 131, can be fitted into interior volume 31 of saddlebag 30 in a drop-in operation. In addition, the fitting of with shelf 128, vertical partitions 129, 130 and transverse partition 131 can be selectively removed and refitted with trunk liner bucket 120 positioned within interior volume 31 of saddlebag 30. Although shown as grooves, embodiments of the present disclosure include features that protrude into the interior space of trunk liner bucket 120 for partitioning devices to rest upon or nestle within.

Figure 15:
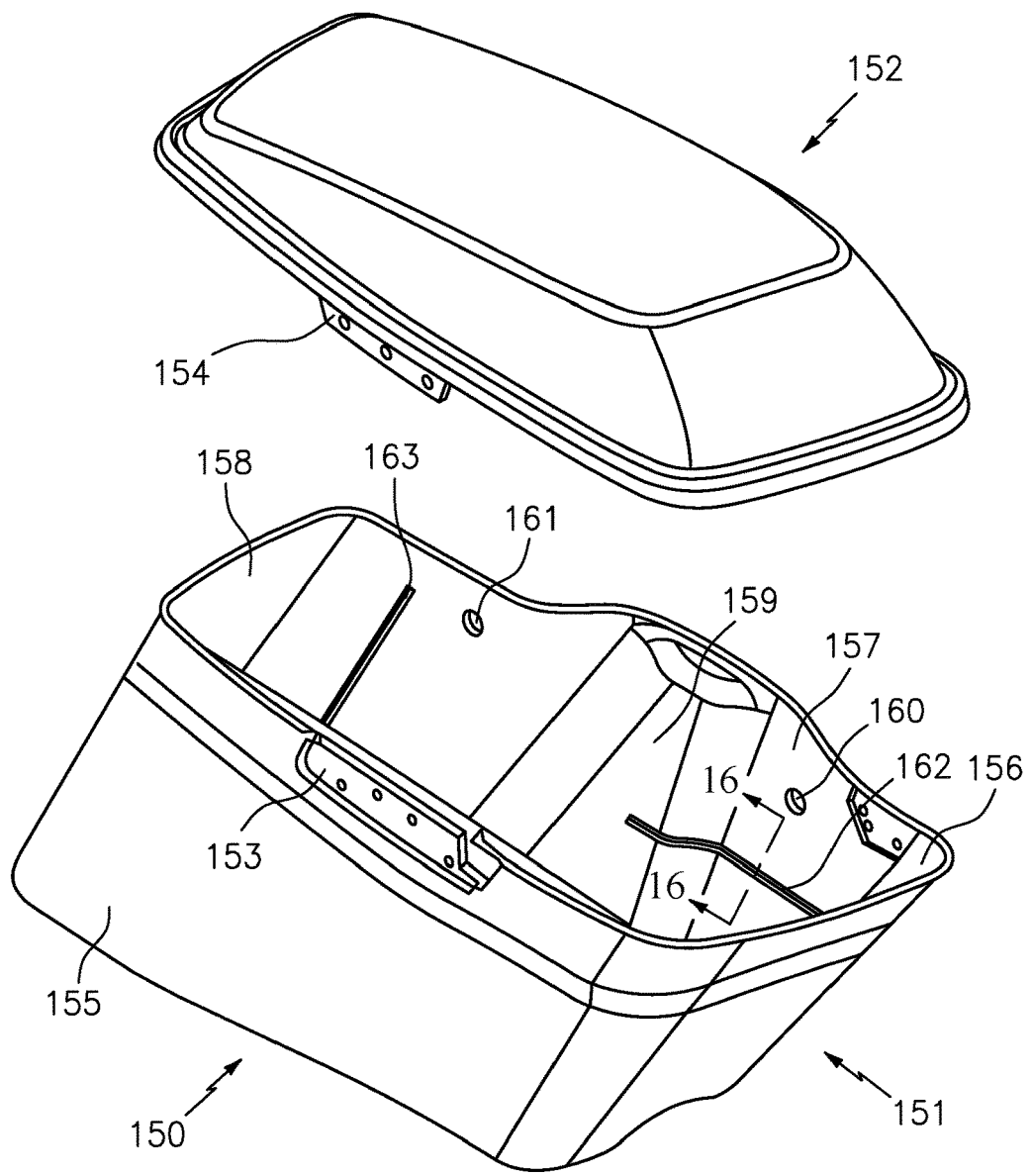
FIG. 15 is a perspective view of a saddlebag with a reconfigurable compartment system and integral configuration features in accordance with certain embodiments of the present disclosure.
Figure 16:
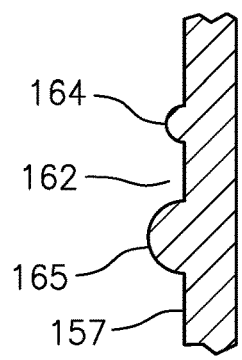
FIG. 16 is a section view taken along section line 16-16 of FIG. 15 showing integral configuration features of a saddlebag in accordance with certain embodiments of the present disclosure.

In other embodiments, some or all of the organizing and configuration features disclosed herein above can be integrally fabricated with the vehicle storage space such as shown with reference to FIG. 15. There is shown a configurable saddlebag system 150 which comprises a saddlebag 151 and a cover 152 with the cover shown detached from the saddlebag. In normal operation, cover 152 is pivotally attached to saddlebag 151 using screws (not shown) to couple hinge 153 to hinge tab 154. Saddlebag 150 is shown as a right-hand-side saddlebag, but it could be a left-hand-side saddlebag or other vehicle storage space without departing from the scope of the present disclosure. Saddle bag 150 is similar to prior art saddlebag 30 (FIGS. 1, 2 and 3) and can be manufactured using similar techniques such as injection molding, blow molding and the like. Saddlebag 150 of the present disclosure includes an outer surface 155 and an interior surface that, in terms of orientation when mounted to a motorcycle 10, comprises a front portion 156, an inside portion 157, a back portion 158 and an outside portion (not shown). Inside portion 157 includes shock tower relief 159 and attachment holes 160, 161. Shock tower relief 159 can be molded during the molding process of manufacturing saddlebag 151 whilst attachment holes 160, 161 can be added using a subsequent manufacturing operation. In this particular embodiment, saddlebag 151 also comprises configuration features such as horizontal groove 162 positioned in inside portion 157, back portion 158 and outside portion. In addition, saddlebag 151 comprises configuration features such as vertical groove 163 positioned in inside portion 157 and a cooperating vertical groove in outside portion (not shown). In this particular embodiment, horizontal groove 162 and vertical groove 162, as well as other configuration features, can be integrally incorporated into the interior volume of saddlebag 151 during the manufacturing process of the saddlebag itself. Now, with reference to FIG. 16, there is shown an embodiment of horizontal groove 162 formed between upper rib 164 and lower rib 165. Although shown as rounded in shape, upper rib 164 and lower rib 165 can be comprised of any selected shape to allow for integral manufacture with saddlebag 151 and providing the configurable function described herein after. Once manufactured as disclosed, the configuration features can be used to selectively configure saddlebag 151 using shelves and partitioning devices as disclosed herein before. For instance, a user can insert an edge shelf 70 (FIGS. 7, 8) into horizontal groove 162, and between upper rib 164 and lower rib 165, starting from shock tower relief 159 and urging the other edges of the shelf downwardly until the shelf is fully seated against lower rib 165. It should be understood by those skilled in the art that, when positioned as disclosed, shelf 70 is captured between upper rib 164 and lower rib 165. Advantageously, vertical groove 163 can be manufactured in a similar fashion to horizontal groove 162 having a forward rib and a rearward rib. In such an embodiment, a user can slidably insert vertical partition 71 (FIG. 7) into vertical groove 163 formed in inside portion 157 and its cooperating groove formed in the outside portion (not shown) starting from the top of saddlebag 151 and urging the vertical partition downwardly until it is fully engaged within the vertical grooves. It should be similarly understood by those skilled in the art that, when positioned as disclosed, vertical partition 71 is captured between the forward rib and the rearward rib. Although the embodiment of FIGS. 15, 16 are disclosed as having the configuration features of horizontal grooves and vertical grooves, it is within the scope of the current disclosure that any number of configuration features can be incorporated into the manufacture of saddlebag 151 such as slots and grooves in any of the interior surfaces of the saddlebag. In addition, saddlebag 151 can comprise configuration features that can include permanent dividers, shelves and partitions incorporated into saddlebag 151 during its manufacture without departing from the scope of the present disclosure so long as some configuration features exist to provide for a configurable stowage system as herein before described.

Figure 17:
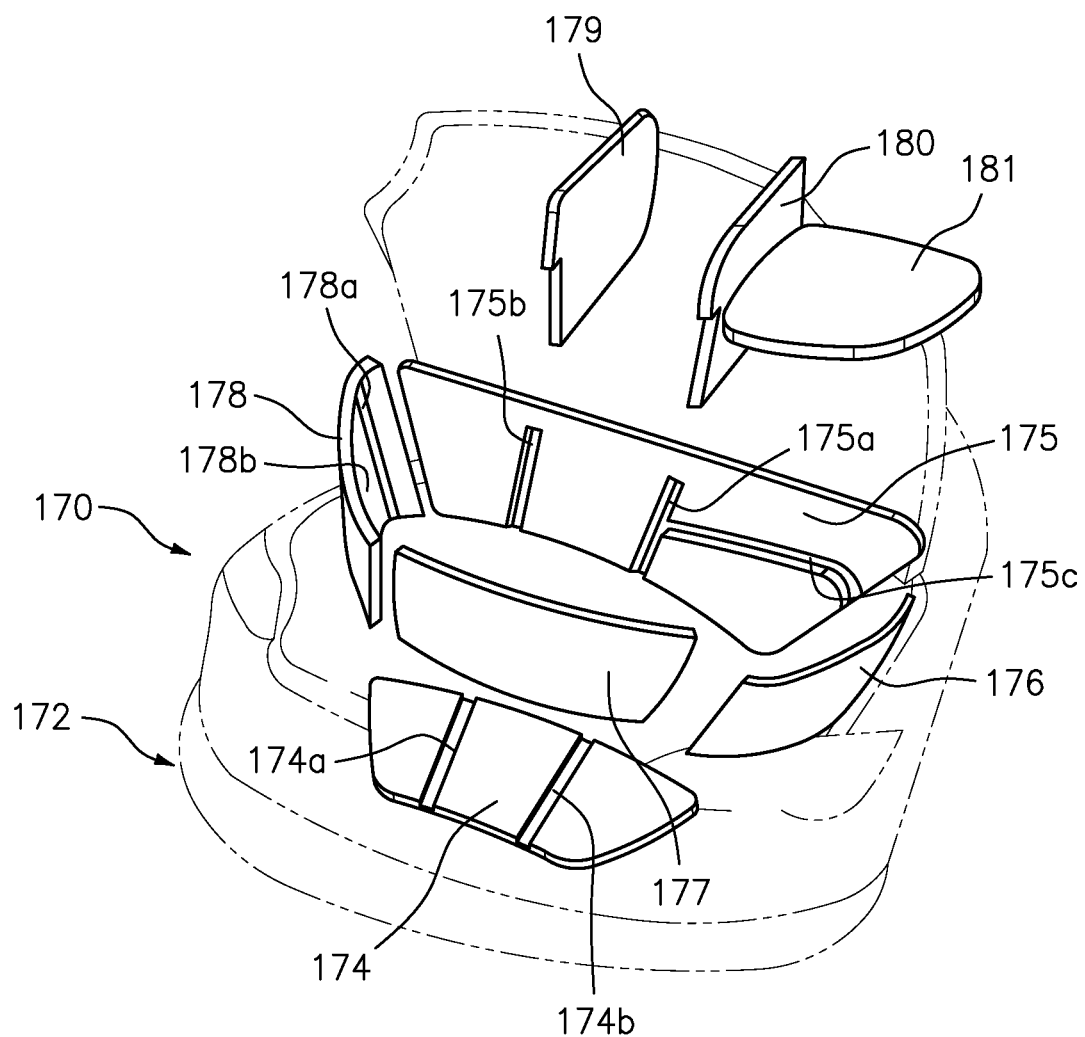
FIG. 17 is a perspective view of a configurable stowage system in accordance with certain embodiments of the present disclosure.
Figure 18:
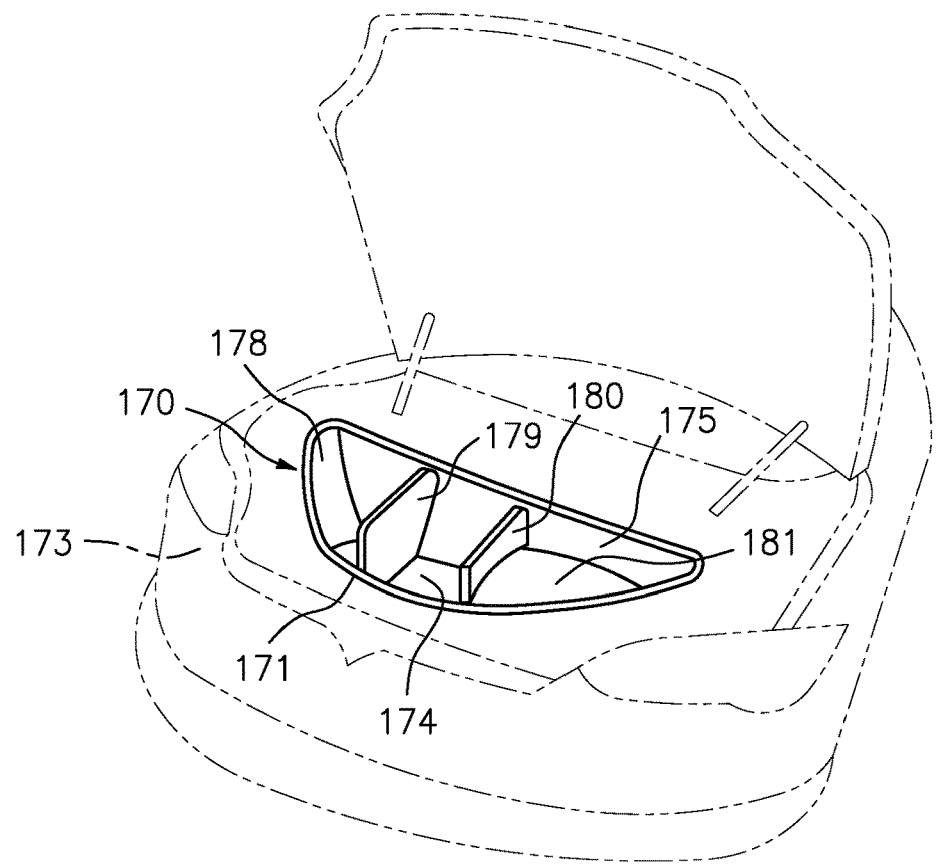
FIG. 18 is a perspective view of a configurable stowage system installed in the frunk of a vehicle in accordance with certain embodiments of the present disclosure.

As disclosed herein the reconfigurable stowage system is not limited to any particular type of vehicle or storage volume. An example of the breadth of this disclosure can be seen with reference to FIGS. 17, 18 where is shown a reconfigurable stowage system 170 configured for positioning within interior volume 171 of frunk 172 of the front end of a vehicle 173 and is comprised of bottom panel 174 (which can comprise a plurality of pieces), rear panel 175, left side panel 176, front panel 177 and right side panel 178. All or some of bottom panel 174, rear panel 175 left side panel 176, front panel 177 and right side panel 178 can be comprised of conformable impact resistant sheet panel 29 (FIG. 4) or variations thereof as described herein above. Some or all of bottom panel 174, rear panel 175, left side panel 176, front panel 177 and right side panel 178 include configuration features. Bottom panel 174 includes configuration features in the form of longitudinal slots 174a, 174b. Rear panel 175 includes configuration features in the form of vertical slots 175a, 175, and horizontal groove 175c. Right side panel 178 includes configuration features in the form of vertical slots 178a, 178b. Although not shown in the figures, front panel 177 includes configuration features in the form of vertical slots mirroring vertical slots 175a, 175, and a horizontal groove mirroring horizontal groove 175c and right side panel 176 includes configuration features in the form of vertical slots that mirror vertical slots 178a, 178b. Also shown in FIGS. 17, 18 are partition devices in the form of right hand vertical partition 179, left hand vertical partition 180 and horizontal shelf 181. Left hand vertical partition 180 includes a configuration feature in the form of a horizontal slot (not shown) and horizontal shelf 181 includes a tab (not shown) that engages with the horizontal slot to stabilize the right hand portion of the horizontal shelf. With specific reference to FIG. 18, there is shown reconfigurable stowage system 170 positioned within the interior of a vehicle storage volume, specifically frunk 172 located in the front of vehicle 173. In certain embodiments, bottom panel 174, rear panel 175, left side panel 176, front panel 177 and right side panel 178 include a fastening layer such as an adhesive layer similar to adhesive layer 23 (FIG. 4) to fix the reconfigurable stowage system 170 within frunk 172. In its assembled condition, reconfigurable stowage system 170 includes bottom panel 174 positioned in the bottom of frunk 172, rear panel 175 positioned in the rear of the frunk, left side panel 176 positioned on the left hand side of the frunk, front panel 177 positioned on the front side of the frunk and right side panel 178 positioned on the right hand side of the frunk. Also in this embodiment, right hand vertical partition 179 is removably positioned within vertical groove 175b and its counterpart in front panel 177; left hand vertical partition 180 is removably positioned within vertical groove 175a and its counterpart in front panel 177; and horizontal shelf 181 is removably positioned within horizontal groove 175c and its counterpart in front panel 177 and the tab is engaged within the slot in left hand vertical partition 180. It should be appreciated that in its assembled condition reconfigurable stowage system 170 provides a plurality of segmented storage areas within frunk 172 and each such storage area is an enclosed area is configured such that articles placed thereon have a limited space within which to move.

Figure 19:
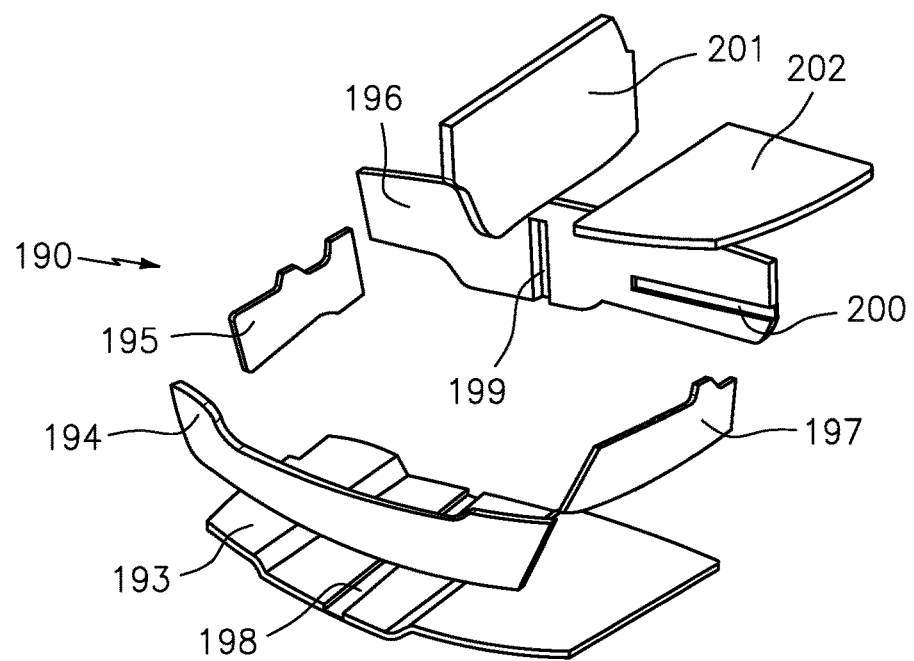
FIG. 19 is a perspective view of a configurable stowage system in accordance with certain embodiments of the present disclosure.
Figure 20:
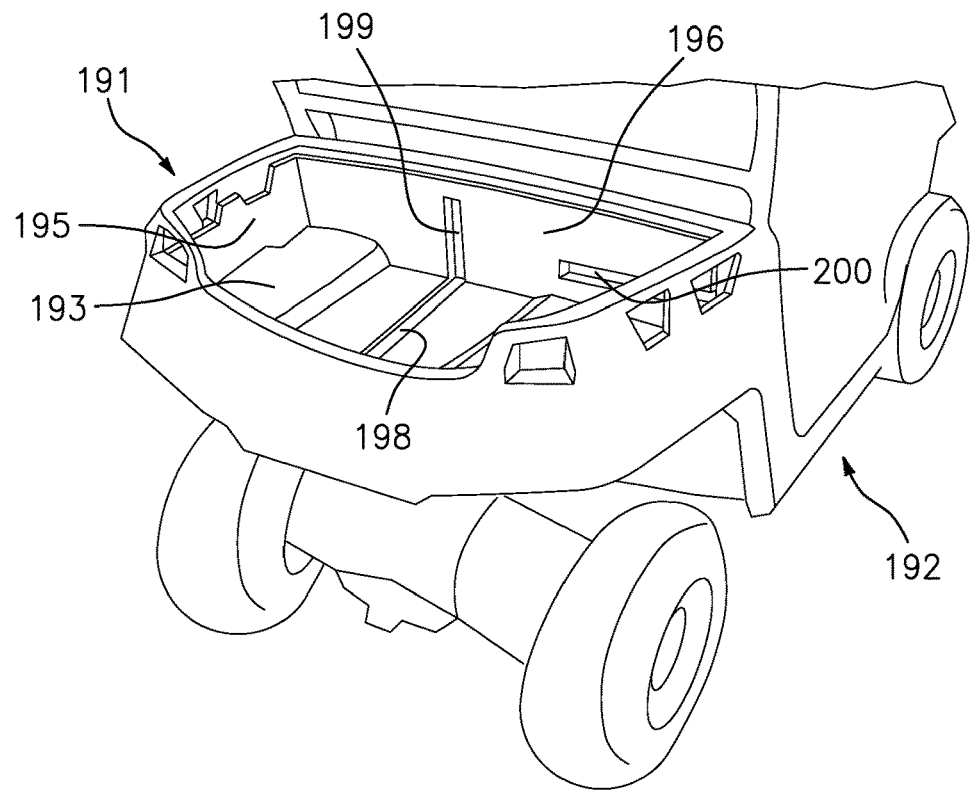
FIG. 20 is a perspective view of a configurable stowage system partially installed in the trunk of a vehicle in accordance with certain embodiments of the present disclosure.
Figure 21:
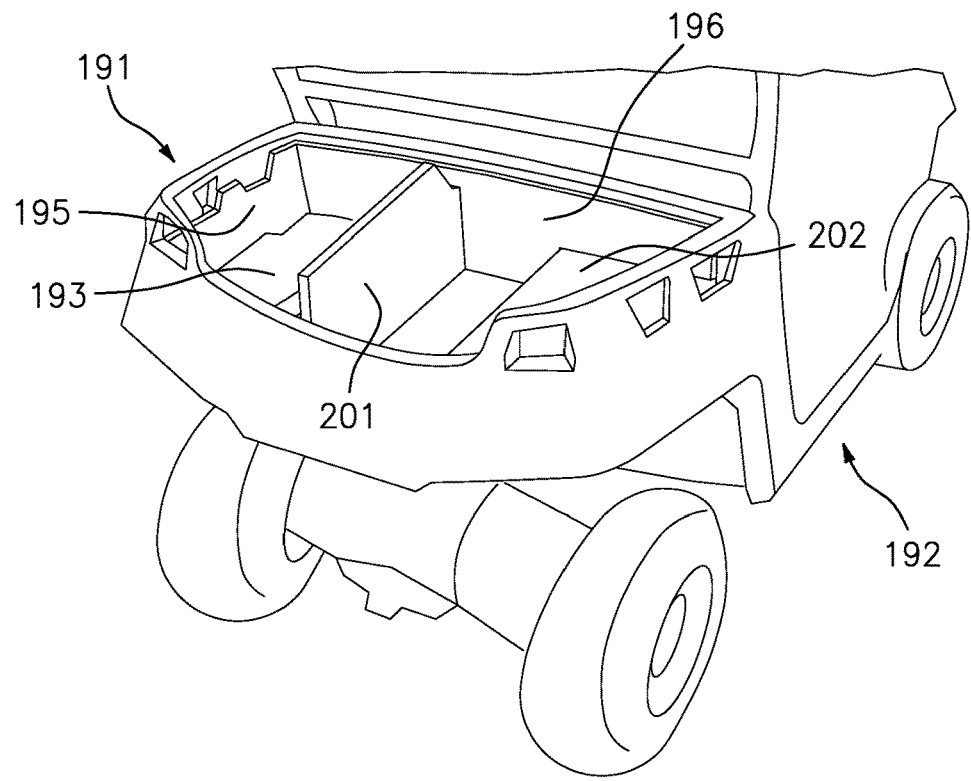
FIG. 21 is a perspective view of a configurable stowage system installed in the trunk of a vehicle in accordance with certain embodiments of the present disclosure.

Another example of the breadth of this disclosure can be seen with reference to FIGS. 19, 20 and 21 where is shown a reconfigurable stowage system 190 configured for positioning within an interior volume of trunk 191 of the rear of a universal terrain vehicle 192 (sometimes referred to as a side-by-side) and is comprised of bottom panel 193 (which can comprise a plurality of pieces), rear panel 194, left side panel 195, front panel 196 and right side panel 197. All or some of bottom panel 193, rear panel 194, left side panel 195, front panel 196 and right side panel 197 can be comprised of conformable impact resistant sheet 29 (FIG. 4) or variations thereof as described herein above. Some or all of bottom panel 193, rear panel 194, left side panel 195, front panel 196 and right side panel 197 can include configuration features. Bottom panel 193 includes configuration features in the form of longitudinal slot 198 and is configured to fit the floor of trunk 191 of universal terrain vehicle 192. Front panel 195 includes configuration features in the form of a vertical slot 199, and a horizontal groove 200. Although not shown in the figures, rear panel 194 includes configuration features in the form of a vertical slot mirroring vertical slot 199 and a horizontal groove mirroring horizontal groove 200. Also shown in FIGS. 19, 20 and 21 are partition devices in the form of vertical partition 201 and horizontal shelf 202. Vertical partition 201 can include a configuration feature in the form of a horizontal slot (not shown) and horizontal shelf 202 can include a tab (not shown) that engages with the horizontal slot to stabilize the right hand portion of the horizontal shelf. With specific reference to FIG. 20, there is shown of bottom panel 193, rear panel 194, left side panel 195, front panel 196 and right side panel 197 positioned within the interior of a vehicle storage volume, specifically trunk 192 located in the rear of universal terrain vehicle 192. In certain embodiments, universal terrain vehicle 192 include a fastening layer such as an adhesive layer similar to adhesive layer 23 (FIG. 4) to fix the reconfigurable stowage system 190 within trunk 192. Now with specific reference to FIG. 21, in its assembled condition, reconfigurable stowage system 190 includes bottom panel 193 positioned in the bottom of trunk 192, rear panel 194 positioned in the rear of the trunk, left side panel 195 positioned on the left hand side of the trunk, front panel 196 positioned on the front side of the trunk and right side panel 197 positioned on the right hand side of the trunk. Also in this embodiment, vertical partition 201 is removably positioned within vertical groove 199 and its counterpart in rear panel 194 and horizontal shelf 202 is removably positioned within horizontal groove 200 and its counterpart in rear panel 194. It should be appreciated that in its assembled condition reconfigurable stowage system 190 provides a plurality of segmented storage areas within trunk 192 and each such storage area is an enclosed area is configured such that articles placed thereon have a limited space within which to move.

Figure 22:
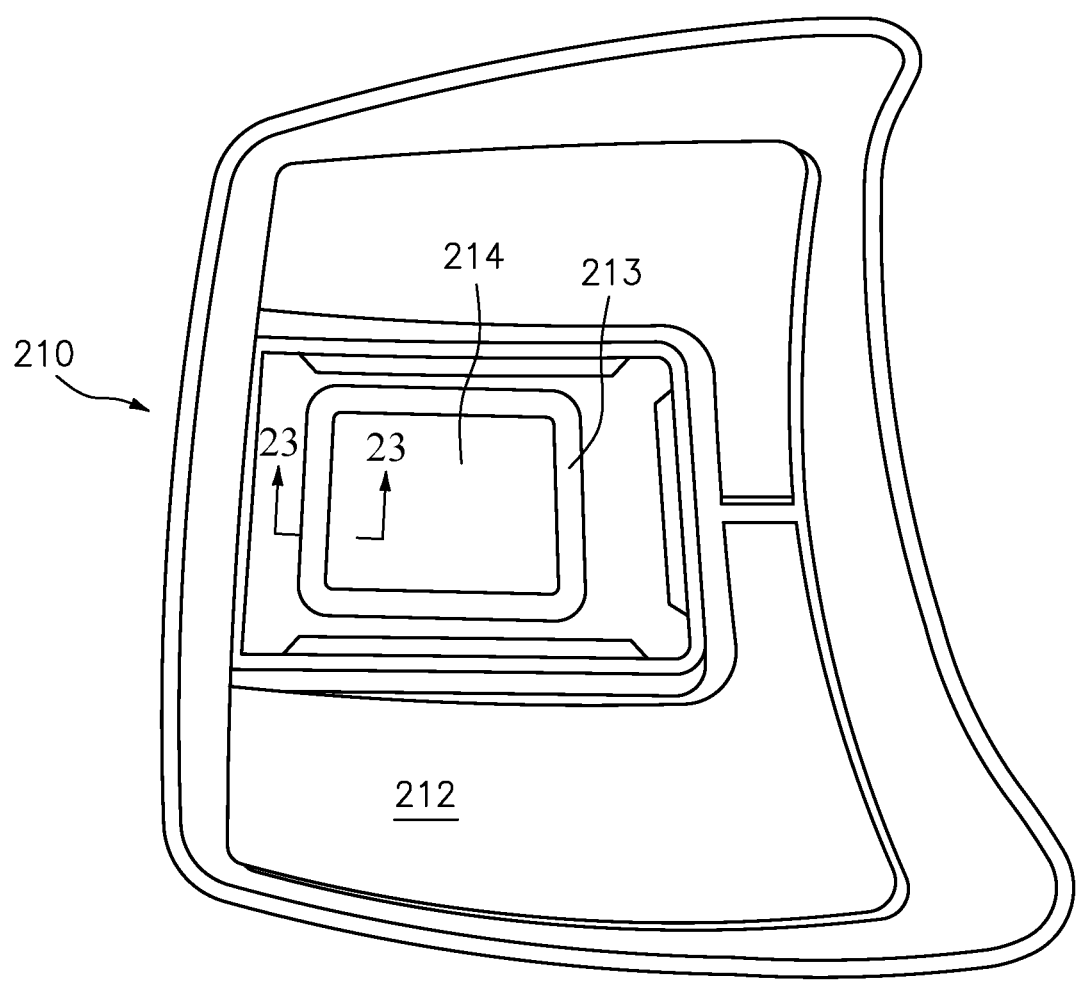
FIG. 22 is a perspective view of a configurable stowage system installed in the trunk lid for a vehicle in accordance with certain embodiments of the present disclosure.
Figure 23:
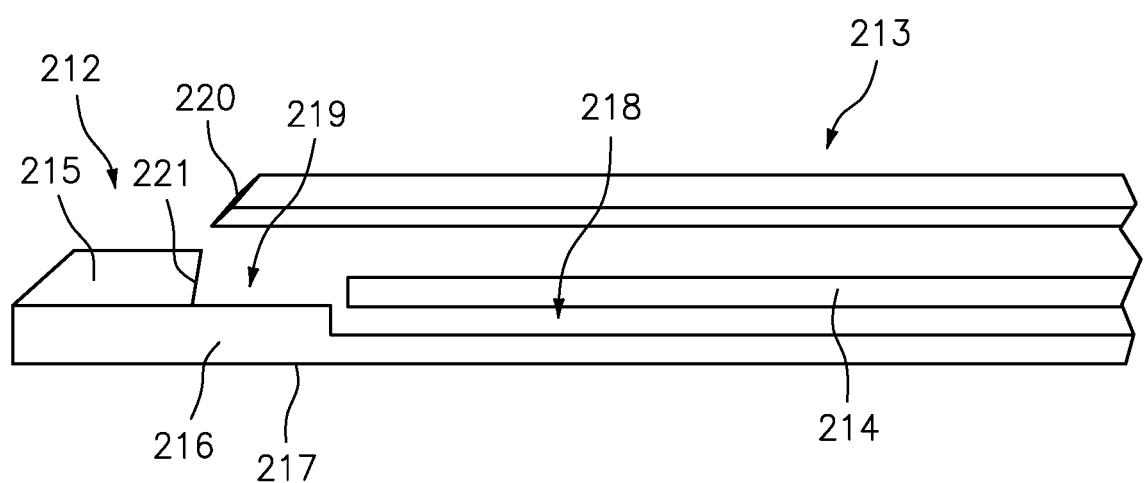
FIG. 23 is a section view taken along section line 23-23 of FIG. 22 showing configuration features, partitions and accessories of a configurable stowage system in accordance with certain embodiments of the present disclosure.
Figure 24:
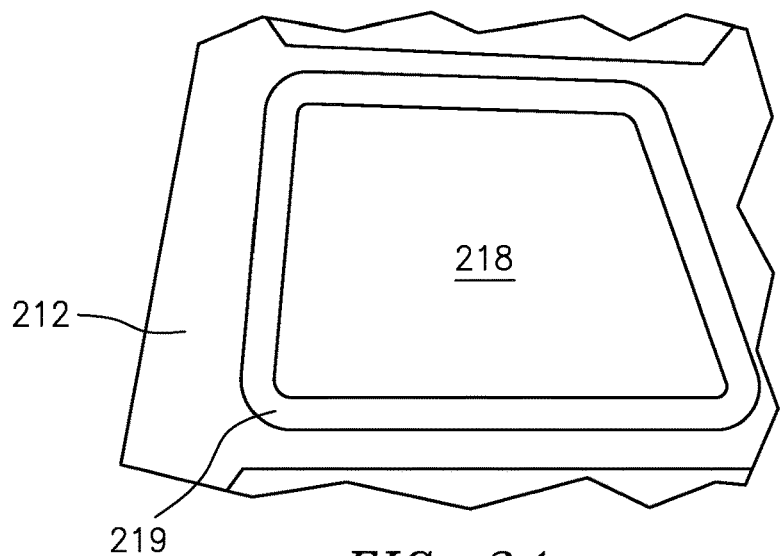
FIG. 24 is a perspective view of a configurable stowage system partially installed in the trunk lid for a vehicle in accordance with certain embodiments of the present disclosure.
Figure 25:
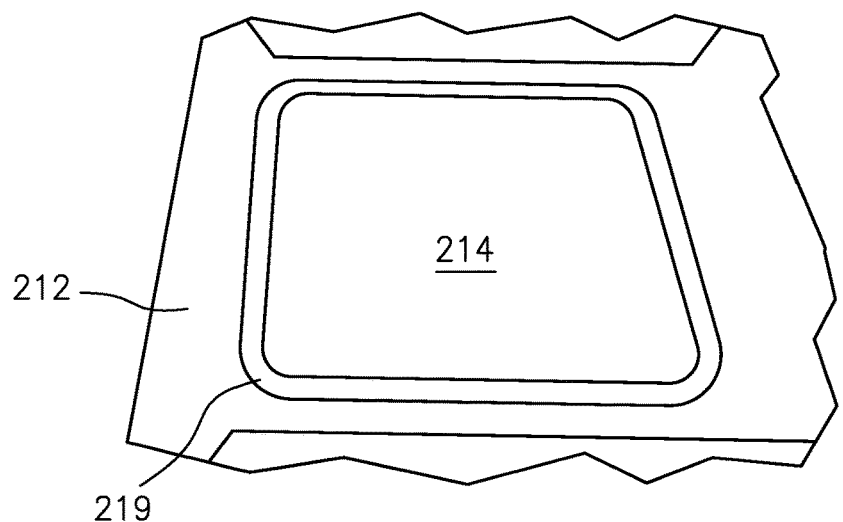
FIG. 25 is a perspective view of a configurable stowage system partially installed in the trunk lid for a vehicle in accordance with certain embodiments of the present disclosure.
Figure 26:
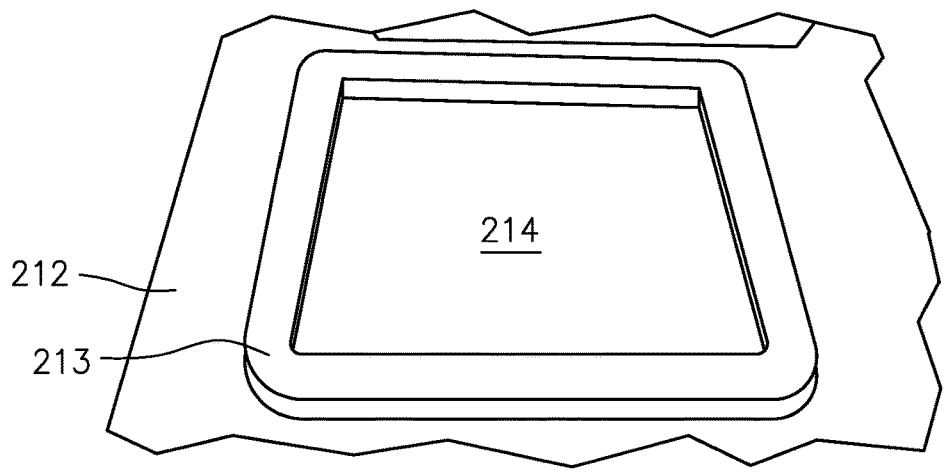
FIG. 26 is a perspective view of a configurable stowage system fully installed in the trunk lid for a vehicle in accordance with certain embodiments of the present disclosure.

Another embodiment of the present disclosure is shown with reference to FIG. 22, wherein reconfigurable stowage system 210 is described with reference to a stowage system for a trunk cover 211 for a rear trunk 21 (FIG. 1). Stowage system 210 is configured to safely stow accessories, such as a mirror, and is comprised of foundation 212, frame 213 and mirror 214. Referring to FIG. 23 as well, foundation 212 is comprised of an impact resistant conformable material and can include a plurality of layers such as top layer 215, bottom layer 216 and adhesive layer 217. Foundation 212 includes configuration features in the form of mirror pocket 218 and frame receiver 219. Frame receiver 219 is formed in foundation 212 by any known method (such as by CNC machining) in top layer 215 in an outline shape to receive frame 213. Mirror pocket 218 is formed in foundation 212 by any known method (such as by CNC machining) through top layer 215 and at least partially into bottom layer 216 in the shape of and thickness of mirror 214. Mirror 214 can include an adhesive layer (not shown) to fix the mirror to mirror pocket 218 of foundation 212. Additionally, a partition device, in the form of frame 213, can include a layer of adhesive (not shown) to fixedly position the frame to frame receiver 219 in foundation 212. In certain embodiments, frame 213 can be removably positioned within frame receiver by interference fir between chamfer 220 around the periphery of the frame and edge 221 of frame receiver 219. In operation, and with reference to FIG. 24, foundation 212 is prepared as described immediately herein above with frame receiver 219 and mirror pocket 218. Next, with reference to FIG. 25, mirror 214 is installed within mirror pocket 218. Finally, and with reference now to FIG. 26, frame 213 is installed within frame receiver 219 capturing mirror 214 within mirror pocket 218. Although the accessory in the forgoing example is a mirror, it is within the scope of the present disclosure that stowage systems can include other known accessories and partitioning devices positioned within configuration features.

Although Claims have been formulated in this Application to particular combinations of features, it should be understood that the scope of the disclosure of the present invention also includes any novel feature or any novel combination of features disclosed herein either explicitly or implicitly or any generalization thereof, whether or not it relates to the same invention as presently claimed in any Claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The Applicants hereby give notice that new Claims may be formulated to such features and/or combinations of such features during the prosecution of the present Application or of any further Application derived therefrom.

What is claimed is:

1. A configurable stowage system for a vehicle storage space the vehicle storage space comprising a plurality of contoured surfaces including a front wall, a back wall, a side wall and a bottom, the configurable stowage system comprising:
    at least one planar impact resistant sheet comprising;
        a first side and a second side;
        a first layer comprising the first side and including a third side;
        a second layer comprising the second side and including a fourth side
        wherein the fourth side is coupled to the third side;
        an adhesion layer disposed on the second side; and
        a plurality of kerf cuts penetrating through the first layer and exposing the second layer and positioned to adapt the at least one planar impact resistant sheet to be drapeable over the plurality of contoured surfaces; and
    wherein the at least one planar impact resistant sheet is adapted to conform to at least a portion of any of the front wall, the back wall, the side wall and the bottom.

2. The configurable stowage system for a vehicle storage space of claim 1 wherein the first layer has a first layer stiffness and the second layer has a second layer stiffness and wherein the first layer stiffness is greater than the second layer stiffness.

3. The configurable stowage system for a vehicle storage space of claim 1 the first layer has a first layer stiffness and the second layer has a second layer stiffness and wherein the first layer stiffness is less than the second layer stiffness.

4. The configurable stowage system for a vehicle storage space of claim 1 further comprising a plurality of configuration features positioned on at least a portion of the first side.

5. The configurable stowage system for a vehicle storage space of claim 4 further comprising at least one partition device adapted to be removably installed in cooperation with at least one of the plurality of configuration features.

6. The configurable stowage system for a vehicle storage space of claim 1 wherein the at least one planar impact resistant sheet is comprised of any of a rubber, a closed cell foam, a polyethylene foam or an EVA foam and wherein the adhesion layer is any of a glue, a pressure sensitive adhesive or a hook-and-loop fastener.

7. The configurable stowage system for a vehicle storage space of claim 5 wherein the configuration features are any of a groove, a kerf cut, a slot or a rib.

8. The configurable stowage system for a vehicle storage space of claim 5 wherein the at least one partition device is any of a shelf, a partition, an accessory holder or a divider.

9. The configurable stowage system for a vehicle storage space of claim 1 wherein the plurality of kerf cuts each have a length, a width and a lengthwise direction and wherein at least one of the widths of the plurality of kerf cuts varies along the length.

10. The configurable stowage system for a vehicle storage space of claim 9 wherein at least two of the lengths of the plurality of kerf cuts are non-parallel along the lengths.

11. A configurable stowage system comprising:
    a saddlebag for a motorcycle comprising a plurality of contoured surfaces including a front wall, a back wall, a side wall and a bottom, the configurable stowage system comprising:
        at least one planar impact resistant sheet comprising:
            a first side and a second side;
            an adhesion layer disposed on the second side;
            a plurality of kerf cuts through the first side and partially through the at least one planar impact resistant sheet; and
        the plurality of kerf cuts positioned to adapt the at least one planar impact resistant sheet to be drapeable over the plurality of contoured surfaces.

12. The configurable stowage system of claim 11 wherein the at least one planar impact resistant sheet is adapted to conform to at least a portion of any of the front wall, the back wall, the side wall and the bottom.

13. The configurable stowage system of claim 12 further comprising:
    the at least one planar impact resistant sheet comprising;
        a first layer comprising the first side and including a third side;
        a second layer comprising the second side and including a fourth side
        wherein the fourth side is coupled to the third side;
        an adhesion layer disposed on the second side; and
        the plurality of kerf cuts penetrate through the first layer and exposing the second layer.

14. The configurable stowage system of claim 13 wherein the first layer has a first layer stiffness and the second layer has a second layer stiffness and wherein the first layer stiffness is substantially different from the second layer stiffness.

15. The configurable stowage system of claim 11 further comprising a plurality of configuration features positioned on at least a portion of the first side.

16. The configurable stowage system of claim 15 further comprising at least one partition device adapted to be removably installed in cooperation with at least one of the plurality of configuration features.

17. The configurable stowage system of claim 16 wherein the configuration features are any of a groove, a kerf cut, a slot or a rib.

18. The configurable stowage system of claim 16 wherein the at least one partition device is any of a shelf, a partition, an accessory holder or a divider.

19. The configurable stowage system of claim 16 wherein:
 the plurality of kerf cuts are positioned proximate the plurality of contoured surfaces and the at least one planar impact resistant sheet is draped thereover; and
 the adhesion layer is applied to at least one of the front wall, the back wall, the side wall and the bottom of the saddlebag.

20. The configurable stowage system of claim 16 wherein the at least one planar impact resistant sheet is comprised of any of a rubber, a closed cell foam, a polyethylene foam or an EVA foam and wherein the adhesion layer is any of a glue, a pressure sensitive adhesive or a hook-and-loop fastener.

* * * * *